(12) United States Patent
Ha et al.

(10) Patent No.: US 12,092,824 B2
(45) Date of Patent: Sep. 17, 2024

(54) OPTICAL DEVICE FOR AUGMENTED REALITY

(71) Applicant: LETINAR CO., LTD, Anyang-si (KR)

(72) Inventors: Jeong Hun Ha, Seoul (KR); Soon Gi Park, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 705 days.

(21) Appl. No.: 17/291,231

(22) PCT Filed: Sep. 3, 2019

(86) PCT No.: PCT/KR2019/011293
§ 371 (c)(1),
(2) Date: May 4, 2021

(87) PCT Pub. No.: WO2020/096188
PCT Pub. Date: May 14, 2020

(65) Prior Publication Data
US 2021/0373341 A1    Dec. 2, 2021

(30) Foreign Application Priority Data

Nov. 6, 2018 (KR) .................. 10-2018-0134979

(51) Int. Cl.
*G02B 27/01* (2006.01)
*F21V 8/00* (2006.01)

(52) U.S. Cl.
CPC ....... *G02B 27/0172* (2013.01); *G02B 6/0055* (2013.01)

(58) Field of Classification Search
CPC .. G02B 27/01; G02B 27/017; G02B 27/0172; G02B 27/0075; G02B 6/00; G02B 6/002; G02B 6/0018; G02B 6/0028; G02B 6/0031; G02B 6/0045; G02B 6/0055; G02B 2027/0123; G02B 2027/0118; G02B 2027/0125; G02B 2027/0145; G02B 2027/0174; G02B 2027/0178
See application file for complete search history.

(56) References Cited

U.S. PATENT DOCUMENTS

2015/0268474 A1* 9/2015 Cheng ................ G02B 27/0172
359/633
2015/0279410 A1* 10/2015 Saitoh .................... G11B 7/003
369/44.14
(Continued)

FOREIGN PATENT DOCUMENTS

CN          1585907 A      2/2005
CN          108064351 A    5/2018
(Continued)

*Primary Examiner* — Sultan Chowdhury
(74) *Attorney, Agent, or Firm* — Rabin & Berdo, P.C.

(57) ABSTRACT

The present invention provides an optical device for augmented reality, the optical device including: an optical means for transmitting at least part of visible light therethrough; and a reflective unit group including a plurality of reflective units disposed in a line along a first direction, which is any straight-line direction, on the surface of the optical means or inside the optical means; wherein the reflective units reflect image light, output from an image output unit configured to output image light corresponding to an image for augmented reality, toward the pupil of an eye of a user.

28 Claims, 16 Drawing Sheets

(56) References Cited

U.S. PATENT DOCUMENTS

| | | | | |
|---|---|---|---|---|
| 2015/0309264 A1* | 10/2015 | Abovitz | ................... | G02B 6/32 |
| | | | | 385/33 |
| 2016/0139412 A1* | 5/2016 | Sawada | .............. | G02B 27/0172 |
| | | | | 359/630 |
| 2018/0284445 A1* | 10/2018 | Matsuki | ............. | G02B 27/0172 |
| 2018/0348562 A1* | 12/2018 | Yoshida | .............. | G02F 1/13362 |

FOREIGN PATENT DOCUMENTS

| | | |
|---|---|---|
| EP | 3104215 A1 | 12/2016 |
| JP | 2017-026704 A | 2/2017 |
| JP | 2017-044853 A | 3/2017 |
| JP | 2018-165743 A | 10/2018 |
| KR | 10-2016-0091402 A | 8/2016 |
| KR | 10-1660519 B1 | 9/2016 |
| KR | 10-2018-0028339 A | 3/2018 |
| KR | 10-2018-0058844 A | 6/2018 |

* cited by examiner

OPTICAL DEVICE FOR AUGMENTED REALITY

TECHNICAL FIELD

The present invention relates generally to an optical device for augmented reality, and more particularly to an optical device for augmented reality that is capable of providing an augmented reality image to a user by using a plurality of small-sized reflective units.

BACKGROUND ART

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for a user to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies using a configuration such as a prism capable of adjusting focal length for a virtual image and a technology for electrically controlling a variable focal lens in response to a change in focal length. However, these technologies also have a problem in that a user needs to perform a separate operation in order to adjust focal length or in that hardware such as a separate processor and software for controlling focal length are required.

In order to overcome the problems of the conventional technologies, the present applicant has developed an apparatus that can implement augmented reality by projecting a virtual image onto the retina through the pupil using a reflective unit having a size smaller than that of the human pupil, as described in Patent Document 1. According to this technology, the apparatus for implementing augmented reality is configured in the form of glasses and a reflective unit is disposed on the surface of a glasses lens or inside the glasses lens to reflect a virtual image generated by a display unit so that an image is formed on the retina through the pupil. Accordingly, a type of pinhole effect is provided by deepening the depth of field, so that a clear virtual image may always be provided regardless of whether the user changes the focal length while gazing at the real world. However, the technology of the present applicant has a limitation in that the field of view is narrow because the small reflective unit is used.

PRIOR ART DOCUMENT

Korean Patent No. 10-1660519 (published on Sep. 29, 2016)

DISCLOSURE

Technical Problem

The present invention has been conceived to overcome the above-described problems, and an object of the present invention is to provide an optical device for augmented reality that may provide an image for augmented reality by using a plurality of reflective units smaller than the pupil.

In particular, another object of the present invention is to provide an optical device for augmented reality that may widen field of view and also improve luminous uniformity by using a plurality of reflective units smaller than the pupil.

Furthermore, another object of the present invention is to provide an optical device for augmented reality that has wide field of view without disconnection of an image for augmented reality by using a plurality of reflective units and forming the distance between the reflective units to be smaller than the size of the pupil.

Moreover, still another object of the present invention is to provide an optical device for augmented reality that may generate a pinhole effect by deepening the depth of field using a plurality of reflective units smaller than the pupil and may also widen field of view and increase an eye box.

Technical Solution

In order to accomplish the above objects, the present invention provides an optical device for augmented reality, the optical device including: an optical means for transmitting at least part of visible light therethrough; and a reflective unit group including a plurality of reflective units disposed in a line along a first direction, which is any straight-line direction, on the surface of the optical means or inside the optical means; wherein the reflective units reflect image light, output from an image output unit configured to output image light corresponding to an image for augmented reality, toward the pupil of an eye of a user.

According to another aspect of the present invention, there is provided an optical device for augmented reality, the optical device including: an optical means for transmitting at least part of visible light therethrough; a first reflective unit group including one or more reflective units arranged in a line along a first direction, which is any straight-line direction, on a surface of the optical means or inside the optical means; and a second reflective unit group including one or more reflective units arranged in a line along the first direction on the surface of the optical means or inside the optical means and arranged in parallel with the reflective units of the first reflective unit group at intervals in a second direction perpendicular to the first direction; wherein the reflective units reflect image light, output from an image output unit configured to output image light corresponding to an image for augmented reality, toward a pupil of an eye of a user; and wherein horizontal lines passing through centers of each of the reflective units of the second reflective unit group and parallel to the second direction and horizontal lines passing through centers of each of the reflective units of the first reflective unit group and parallel to the second direction are sequentially arranged in parallel with one another.

According to another aspect of the present invention, there is provided an optical device for augmented reality, the optical device including: an optical means for transmitting at least part of visible light therethrough; and n reflective unit groups (where n is a natural number equal to or larger than 2) each including one or more reflective units arranged in a line along a first direction, which is any straight-line direction, on a surface of the optical means or inside the optical means; wherein the n reflective unit groups are sequentially arranged in parallel with each other at intervals in a second direction perpendicular to the first direction on the surface of the optical means or inside the optical means; wherein each of the reflective units constituting the n reflective unit groups reflects image light, output from an image output unit configured to output image light corresponding to an image for augmented reality, toward a pupil of an eye of a user; and wherein a k-th reflective unit group among the n reflective unit groups is arranged in a protruded manner such that a height of reflective units constituting the k-th reflective unit group in a direction, perpendicular to the first and second directions, from a plane p formed by the first and second directions of the first reflective unit group is higher than a height of reflective units constituting a (k−1)-th reflective unit group in the direction, perpendicular to the first and second directions, from the plane p (where k is a natural number in a range of 2≤k≤n).

According to another aspect of the present invention, there is provided an optical device for augmented reality, the optical device including: an optical means for transmitting at least part of visible light therethrough; a first reflective unit group including one or more reflective units arranged in a line along a first direction, which is any straight-line direction, on a surface of the optical means or inside the optical means; and a second reflective unit group including one or more reflective units arranged in a line along the first direction on the surface of the optical means or inside the optical means and arranged in parallel with the reflective units of the first reflective unit group at intervals in a second direction perpendicular to the first direction; wherein the reflective units reflect image light, output from an image output unit configured to output image light corresponding to an image for augmented reality, toward a pupil of an eye of a user; and wherein each pair of reflective units of the first and second reflective unit groups located alongside each other in the second direction partially overlap each other when viewed in the second direction.

According to another aspect of the present invention, there is provided an optical device for augmented reality, the optical device including: an optical means for transmitting at least part of visible light therethrough; a first reflective unit group including one or more reflective units arranged in a line along a first direction, which is any straight-line direction, on a surface of the optical means or inside the optical means; and a second reflective unit group including one or more reflective units arranged in a line along the first direction on the surface of the optical means or inside the optical means and arranged in parallel with the reflective units of the first reflective unit group at intervals in a second direction perpendicular to the first direction; wherein the reflective units of the first reflective unit group are made of a translucent material and transmit part of image light, output from the image output unit configured to output image light corresponding to an image for augmented reality, therethrough to the reflective units of the second reflective unit group while reflecting part of the image light, output from the image output unit, toward a pupil of an eye of a user; and wherein the reflective units of the second reflective unit group reflect the image light, incident through the reflective units of the first reflective unit group made of the translucent material, toward the pupil of the eye of the user.

According to another aspect of the present invention, there is provided an optical device for augmented reality, the optical device including: an optical means for transmitting at least part of visible light therethrough; a first reflective unit group including one or more reflective units arranged in a line along a first direction, which is any straight-line direction, on a surface of the optical means or inside the optical means; and a second reflective unit group including one or more reflective units arranged in a line along the first direction on the surface of the optical means or inside the optical means and arranged in parallel with the reflective units of the first reflective unit group at intervals in a second direction perpendicular to the first direction; wherein through holes are formed in the reflective units of the first reflective unit group for transmitting incident light therethrough, and transmit part of image light, output from the image output unit configured to output image light corresponding to an image for augmented reality, therethrough to the reflective units of the second reflective unit group, and reflect part of the image light, output from the image output unit, toward a pupil of an eye of a user through portions of the reflective units other than the through holes; and wherein the reflective units of the second reflective unit group reflect the image light, incident through the through holes of the reflective units of the first reflective unit group, toward the pupil of the eye of the user.

In this case, each of the plurality of reflective units may be disposed such that a distance to its adjacent reflective unit is 8 mm or less.

Furthermore, the distance between the adjacent reflective units may be a minimum value between points on boundary lines of orthogonal projections of the adjacent reflective units projected onto a plane perpendicular to a forward direction from the pupil when the user gazes forward.

Furthermore, the size of each of the plurality of reflective units may be 8 mm or less.

Furthermore, the size of each of the plurality of reflective units may be a maximum length between any two points on the boundary line of the reflective unit.

Furthermore, the size of each of the plurality of reflective units may be a maximum length between any two points on the boundary line of the orthogonal projection of the reflective unit projected onto a plane perpendicular to a forward direction from the pupil when the user gazes forward.

Furthermore, the area of each of the plurality of reflective units may be formed to have a value of $16\pi$ (mm$^2$) or less.

Furthermore, the area of each of the plurality of reflective units may be the area of the orthogonal projection of the reflective unit projected onto a plane perpendicular to a forward direction from the pupil when the user gazes forward.

Furthermore, the shape of each of the plurality of reflective units may be formed in an asymmetric shape representing a shape other than a point-symmetric shape; and the point-symmetric shape may be a shape in which there is a specific point that allows the shape to be always a same for all rotation angles when a corresponding reflective unit is rotated around a specific point on a plane of the reflective unit, and the asymmetric shape may be a shape that is not a point-symmetric shape, which is a shape in which there is no specific point that allows the shape to be always a same for all rotation angles when a corresponding reflective unit is rotated around a specific point on a plane of the reflective unit.

Advantageous Effects

According to the present invention, there may be provided an optical device for augmented reality that may provide an image for augmented reality by using a plurality of reflective units smaller than the pupil.

Further, the present invention may provide an optical device for augmented reality that may widen field of view and also improve luminous uniformity by using a plurality of reflective units smaller than the pupil.

Furthermore, the present invention may provide an optical device for augmented reality that has wide field of view without disconnection of an image for augmented reality by using a plurality of reflective units and forming the distance between the reflective units to be smaller than the size of the pupil.

Furthermore, the present invention may provide an optical device for augmented reality that may generate a pinhole effect by deepening the depth of field using a plurality of reflective units smaller than the pupil and may also widen field of view and increase an eye box.

BEST MODE

Embodiments of the present invention will be described in detail below with reference to the accompanying drawings.

First, prior to describing an optical device 100 for augmented reality according to the present invention, the basic principle of the present invention will be described.

Figure 1:
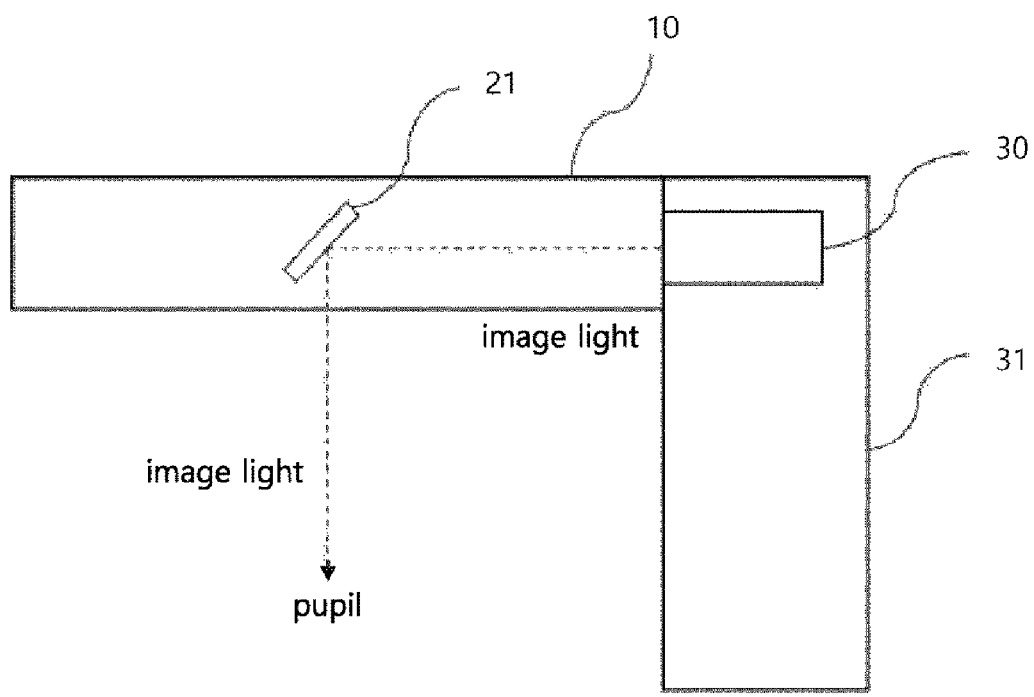
FIG. 1 is a diagram showing a conventional optical device for augmented reality in which one reflective unit (21) is disposed.

FIG. 1 is a diagram showing a prior optical device for augmented reality in which one reflective unit 21 is disposed, and is similar to the technology disclosed in the [Prior Art Document] which was filed by the present application and granted.

Referring to FIG. 1, an image output unit 30 is a means for outputting image light corresponding to an image for augmented reality, and is a small-sized display device. A reflective unit 21 provides an image for augmented reality to a user by reflecting image light, output from the image output unit 30, toward the pupil of the user.

An optical means 10 is a means such as a glasses lens, and the reflective unit 21 is embedded inside the optical means 10. A frame unit 31 is a means for fixing and supporting both the image output unit 30 and the optical means 10.

The reflective unit 21 shown in FIG. 1 is formed to have a size smaller than the size of the human pupil, i.e., 8 mm. By forming the reflective unit 21 to be smaller than the size of the pupil as described above, the depth of field for light incident on the pupil through the reflective unit 21 may be made considerably deep. Here, the depth of field refers to a range within which an image for augmented reality is recognized as being in focus. When the depth of field gets deeper, a focal length for an image for augmented reality gets increased accordingly. Thus, when a user changes the focal length for the real world while gazing at the real world, an image for augmented reality is always recognized as being in focus regardless of a change of the focal length. This may be viewed as a kind of pinhole effect.

The present applicant obtained a patent for [Prior Art Document] based on the idea that the depth of field can be deepened by using the reflective unit 21 having a size smaller than that of the pupil. However, the structure using the single reflective unit 21 has the advantage of obtaining an effect such as a pinhole effect by deepening the depth of field, but has a limitation in that the field of view is narrow.

Accordingly, in order to solve the limitation in which the field of view is narrow, the present applicant has proposed a structure that is capable of widening the field of view while maintaining the advantage of deepening the depth of field by using a plurality of reflective units 20.

An optical device 100 for augmented reality according to the present invention will be described in greater detail below.

Figure 2:
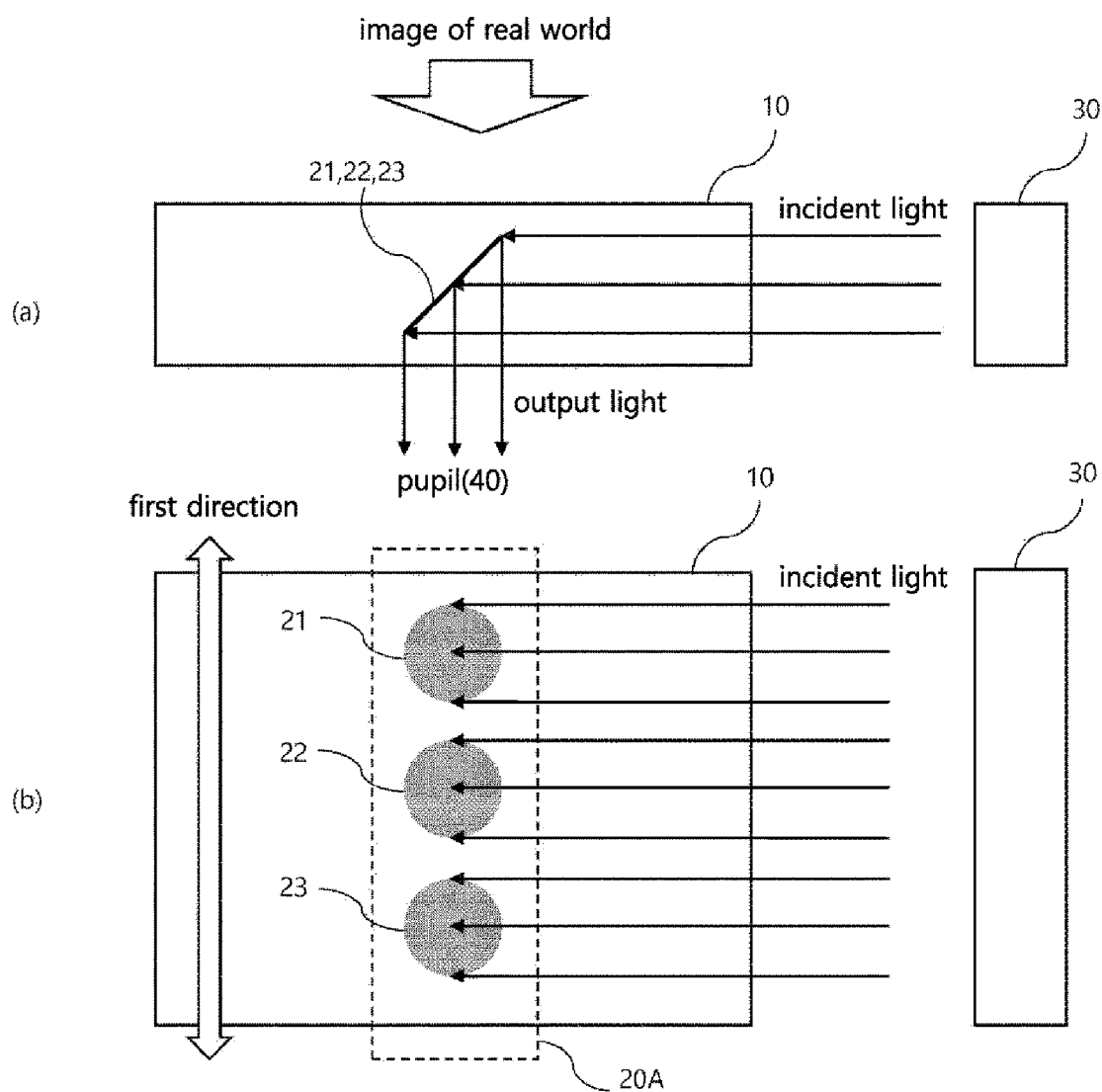
FIG. 2 shows diagrams illustrating the overall configuration of an optical device (100) for augmented reality according to an embodiment of the present invention.

FIG. 2 shows diagrams illustrating the overall configuration of the optical device 100 for augmented reality according to an embodiment of the present invention, wherein FIG. 2(a) is a top view when viewed in a state in which the optical device 100 for augmented reality is placed in front of a user and FIG. 2(b) is a front view when the optical device 100 for augmented reality is placed in front of the user.

Referring to FIG. 2, the optical device 100 for augmented reality (hereinafter simply referred to as the "optical device 100") of the present embodiment includes an optical means 10 and a reflective unit group 20 including a plurality of reflective units 21, 22, and 23. The image light output from the image output unit 30 configured to output image light corresponding to an image for augmented reality is reflected to the pupil 40 of an eye of the user by the reflective units 21, 22, and 23 constituting a reflective unit group 20A, thereby providing the image for augmented reality to the user.

The image output unit 30 is a means for outputting image light corresponding to an image for augmented reality toward the reflective units 21, 22, and 23 of the reflective unit group 20A, and may be, e.g., a display device such as a small-sized LCD.

The display device is a means for displaying an image for augmented reality on a screen, and displays an image for augmented reality in such a manner as to emit light so that the reflective units 21, 22, and 23 reflect the image for augmented reality to be projected onto the pupil 40 of the user. The image light corresponding to the image for augmented reality displayed on the display device is output and transferred to the reflective units 21, 22, and 23.

Meanwhile, the image output unit 30 may be a reflective means or a refractive means that transfers image light, output from such a display device, to the reflective units 21, 22, and 23 by reflecting or refracting the image light. In this case, the image light output from the display device is not directly output to the reflective units 21, 22, and 23, but is transferred to the reflective units 21, 22, and 23 through the reflective means or the refractive means.

Furthermore, the image output unit 30 may be a collimator that outputs image light, output from the display device, as collimated parallel light. Alternatively, such a collimator may be disposed on a reflective or refractive means and a display device.

In other words, the image output unit 30 refers to various means, such as a reflective means or refractive means, for finally transmitting image light, output from a display device for displaying an image for augmented reality, to the reflective units 21, 22, and 23.

Here, the image for augmented reality refers to an image displayed on the display device, which is a virtual image to be provided through a pupil of a user via the reflective units 21, 22, and 23, and may be a still image or moving image. The image for augmented reality is output as image light corresponding to the image for augmented reality, and is provided as a virtual image through a pupil of a user via the plurality of reflective units 21, 22, and 23. At the same time, the user receives an image of the real world that is directly recognized with an eye. Accordingly, the user may be provided with an augmented reality service.

Meanwhile, although the image output unit 30 is disposed on a right side based on a case where the user gazes forward in FIG. 1, the location of the image output unit 30 is not limited thereto, but the image output unit 30 may be disposed on an upper side, a lower side, or a diagonally upper or lower side. For example, when an apparatus for implementing augmented reality including the optical device 100 for augmented reality according to the present invention is implemented in the form of, e.g., glasses, the image output unit 30 may be disposed at an appropriate location on a glasses frame.

The display device may have only the function of receiving an image signal from an external separate image playback device and simply displaying an image, or may be integrated with a device having a processor and memory and also having the function of storing and playing back an image.

Since the display device itself is not a direct objective of the present invention and a conventionally known device capable of displaying an image on a screen may be employed, a detailed description thereof will be omitted.

The optical means 10 may be a lens for transmitting at least part of visible light therethrough. The plurality of reflective units 21, 22, and 23 is disposed in a line inside the optical means 10 or on the surface of the optical means 10.

In this case, "transmitting at least part of visible light" means that the transmittance of visible light is in the range of 0 to 100%. When the optical device 100 is located in a forward direction from the pupil 40 of the eye of the user, as shown in FIG. 2, the optical means 10 outputs image light corresponding to an image for augmented reality to the pupil 40 by reflecting the image light by means of the reflective unit 20 while allowing the user to recognize an image of the real world through the pupil 40. Accordingly, the image of the real world and the image for augmented reality may be superimposed on each other and provided, thereby providing an augmented reality service.

As shown in FIG. 1, the optical means 10 may be implemented in the form of, e.g., a rectangular lens module, and the lens module may be detachably coupled to an apparatus for implementing augmented reality in the form of glasses. Alternatively, when an apparatus for implementing augmented reality including the optical device 100 for augmented reality according to the present invention is implemented in the form of glasses, the optical means 10 may be implemented in the form of a glasses lens.

Meanwhile, the plurality of reflective units 21, 22, and 23 performs the function of reflecting the image light corresponding to an image for augmented reality, output from the image output unit 30, toward the pupil 40 of the eye of the user, thereby providing the image for augmented reality to the user. The plurality of reflective units 21, 22, and 23 is disposed on the surface of the optical means 10 or inside the optical means 10 in a line in a first direction, which is a straight-line direction, and forms a reflective unit group 20A.

In FIG. 1, the reflective parts 21, 22, and 23 are disposed in a line in which the the first direction is a vertical direction, but this is merely an example. It is obvious that the reflective parts 21, 22, and 23 may be disposed in a horizontal direction, a diagonal direction or any other direction. The direction in which the reflective units 21, 22, and 23 are arranged may be determined depending on the position of the image output unit 30. However, in practice, as shown in FIG. 1, the reflective units 21, 22, and 23 are arranged in the vertical direction, and then the optical means 10 is rotated in a direction corresponding to the position of the image output unit 30.

As shown in FIG. 2, the plurality of reflective units 21, 22, and 23 reflects the image light corresponding to the image for augmented reality, output from the image output unit 30, toward the pupil 40, so that the image for augmented reality and an image of the real world are superimposed on each other and then provided, thereby providing an augmented reality service. In other words, the plurality of reflective units 21, 22, and 23 reflects the image light, output from the image output unit 30, toward the pupil 40 of the eye of the user, thereby providing the user with the image for augmented reality displayed on the display device.

To this end, the plurality of reflection units 21, 22, and 23 is disposed to have an appropriate angle between the image output unit 30 and the pupil 40. Preferably, the plurality of reflection units 21, 22, and 23 is disposed to have an angle that allows the image light, incident onto the center of the reflective units 21, 22, and 23, to be reflected and incident onto the center of the pupil 40 when each of the plurality of reflective units 21, 22, and 23 is located in front of the pupil 40 of the user.

For example, in FIG. 2, it is assumed that the plurality of reflective units 21, 22, and 23 is located in a forward direction from the pupil 40 when the user gazes forward and the image output part 40 is located in an upper portion in the forward direction from the pupil 40. Accordingly, in this case, as shown in FIG. 2(*a*), each of the reflective units 21, 22, and 23 is disposed to have an inclination of about 45 degrees and to be inclined outward in the forward direction from the pupil 40.

Meanwhile, in the embodiment of FIG. 2, it is preferable that the size of each of the plurality of reflective units 21, 22, and 23 be also smaller than the size of the human pupil, as described in conjunction with FIG. 1. In other words, it is preferable that the size of each of the plurality of reflective units 21, 22 and 23 be 8 mm or less. In this case, the size of each of the reflective units 21, 22, and 23 is defined to mean the maximum length between any two points on the boundary line of each of the reflective units 21, 22, and 23.

In this case, the size of each of the reflective units 21, 22, and 23 may be the maximum length between any two points on the boundary line of the orthogonal projection of each of the reflective units 21, 22, and 23 projected onto a plane perpendicular to a forward direction from the pupil 40 when the user gazes forward.

Furthermore, each of the reflective units 21, 22, and may not be disposed in the center in the forward direction from the pupil 40 of the user. In this case, the size of each of the reflective units 21, 22, and 23 may be the maximum length between any two points on the boundary line of the orthogonal projection of each of the reflective units 21, 22, and 23 projected onto a plane perpendicular to the direction from the pupil 40 to each of the reflective units 21, 22, and 23 when the user gazes in the direction of each of the reflective units 21, 22, and 23.

Meanwhile, the sizes of the plurality of reflective units 21, 22, and 23 are preferably the same, but are not necessarily the same. The sizes may be partially different when necessary.

Furthermore, in the embodiment of FIG. 2, it is preferable that the area of each of the plurality of reflective units 20 may be formed to be smaller than the area of the human pupil 40. For example, when the pupils of people are considered to have a circular shape, the diameters of the pupils range from 2 to 8 mm and the radii thereof range from 1 to 4 mm. Accordingly, the areas of the pupils have a maximum of $16\pi$ (mm$^2$) according to the equation "$\pi r^2$," and thus the area of each of the plurality of reflective units 20 may be formed to have a value of $16\pi$ (mm$^2$) or less.

In this case, the area of each of the plurality of reflective units 21, 22, and 23 may be the area of the orthogonal projection of each of the reflective units 21, 22, and 23 projected onto a plane perpendicular to a forward direction from the pupil 40 when the user gazes forward.

Furthermore, each of the reflective units 21, 22, and 23 may not be disposed in the center in the forward direction from the pupil 40 of the user. In this case, the area of each of the reflective units 21, 22, and 23 may be the area of the orthogonal projection of each of the reflective units 21, 22, and 23 projected onto a plane perpendicular to a direction from the pupil 40 to the reflective unit 21, 22, and 23 when the user gazes in the direction of each of the reflective units 21, 22, and 23.

Meanwhile, the areas of the plurality of reflective units 21, 22, and 23 are preferably the same, but are not necessarily the same. The areas may be partially different when necessary.

In the embodiment of FIG. 2, the plurality of reflective units 21, 22, and 23 is disposed in the vertical direction, and thus a wide field of view may be acquired in the vertical direction. If a wide field of view is required in the horizontal direction, the image output unit 30 may be positioned on an upper or lower side by rotating the optical means 10 of the embodiment of FIG. 1 by 90 degrees.

Figure 3:
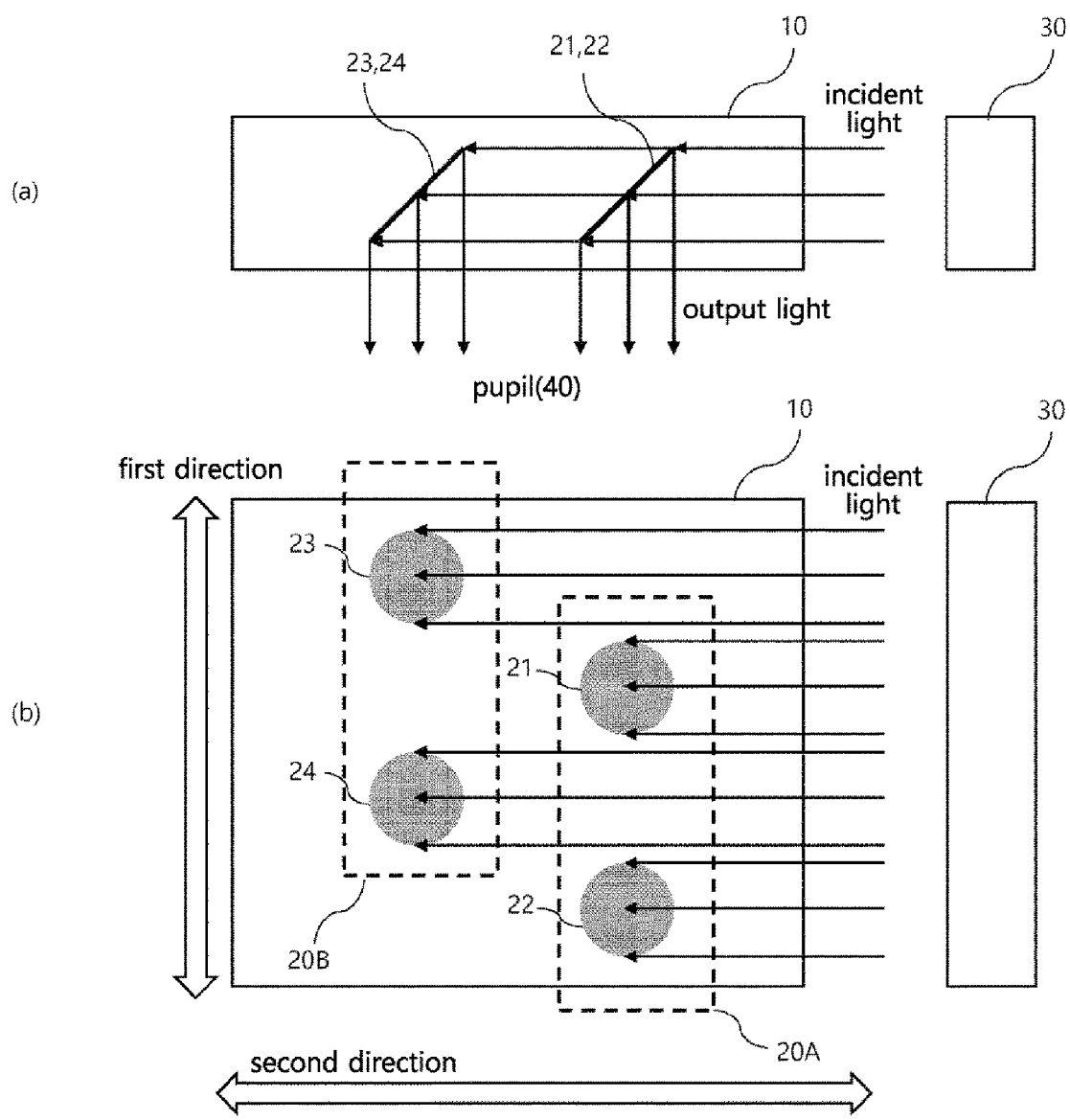
FIG. 3 shows diagrams of an optical device (100) for augmented reality according to another embodiment of the present invention.

FIG. 3 shows diagrams of an optical device 100 for augmented reality according to another embodiment of the present invention, wherein FIG. 3(a) is a top view when viewed in a state in which the optical device 100 for augmented reality is placed in front of a user and FIG. 3(b) is a front view when the optical device 100 for augmented reality is placed in front of the user.

The embodiment of FIG. 3 is characterized in that two reflective unit groups 20A and 20B such as those described in FIG. 2 are disposed such that the centers of reflective units constituting each of the reflective unit groups 20A and 20B and the centers of reflective units constituting the remaining one of the reflective unit groups 20A and 20B are not arranged alongside each other in a second direction perpendicular to the first direction, but are arranged to be off-centered with each other.

In other words, in the optical device 100 of augmented reality of the embodiment of FIG. 3, a first reflective unit group 20A including one or more reflective units 21 and 22 arranged in a line along a first direction, which is any one straight-line direction, on the surface of the optical means 10 or inside the optical means 10, as described in FIG. 2, is disposed. Further, there is disposed a second reflective unit group 20B including one or more reflective units 23 and arranged in a line along the first direction on the surface of the optical means 10 or in the inside of the optical means 10 and arranged in parallel with the reflective units 21 and 22 of the first reflective unit group 20A at intervals in a second direction perpendicular to the first direction.

Each of the reflective units 21, 22, 23, and 24 reflects the image light, output from the image output unit configured to output image light corresponding to an image for augmented reality, toward the pupil of an eye of a user, as described in FIG. 2

In this case, horizontal lines being parallel to the second direction and passing through the centers of the reflective units 23 and 24 of the second reflective unit group 20B, respectively, and horizontal lines being parallel to the second direction and passing through the centers of the reflective units 21 and 22 of the first reflective unit group 20A, respectively, are sequentially arranged in parallel with one another.

Figure 4:
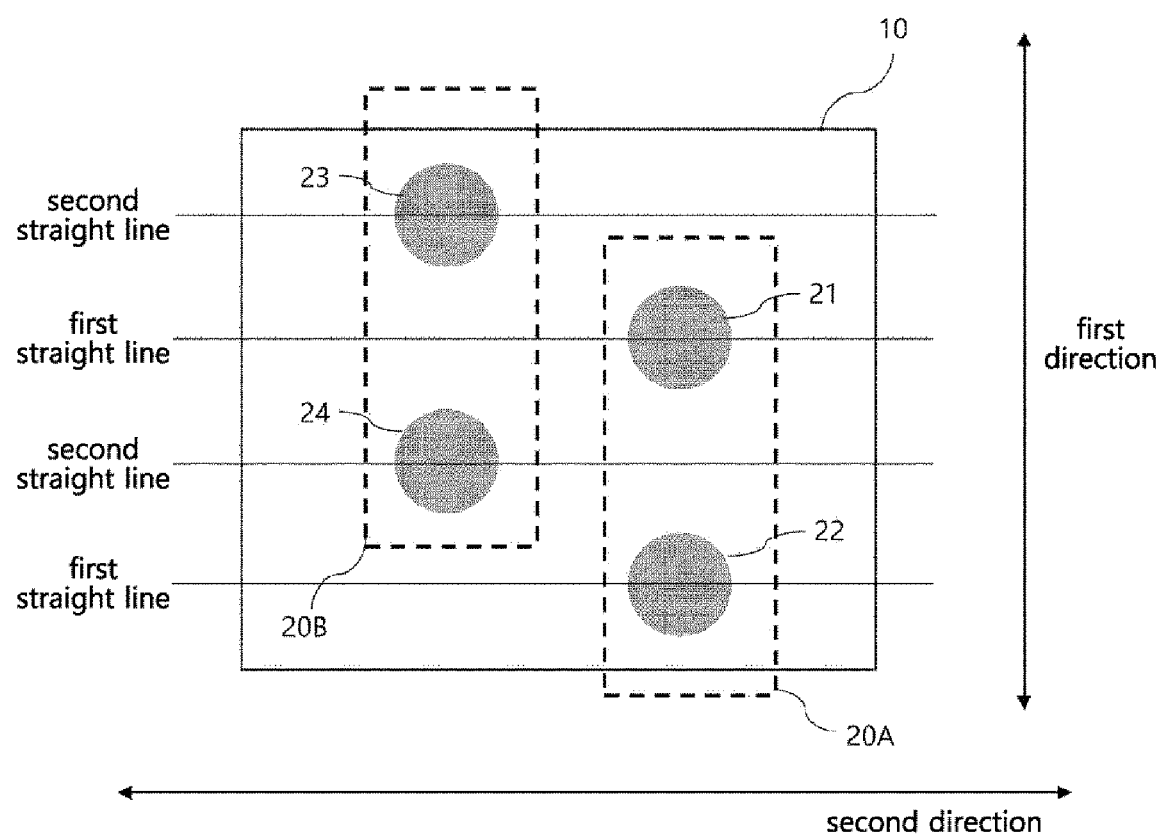
FIG. 4 is a diagram illustrating the arrangement relationship between the reflective unit groups (20A and 20B) of the embodiment of FIG. 3.

FIG. 4 is a diagram illustrating the arrangement relationship between the reflective unit groups 20A and 20B of the embodiment of FIG. 3.

As shown in FIG. 4, a horizontal line ("first" second straight line) parallel to the second direction perpendicular to the first direction while passing through the center of the first reflective unit 23 of the second reflective unit group 20B from above and a horizontal line ("first" first straight line) parallel to the second direction perpendicular to the first direction while passing through the center of the first reflective unit 21 of the first reflective unit group 20A from above are parallel to each other.

Also, The "first" first straight line and a parallel line ("second" second straight line) parallel to the second direction while passing through the center of the second reflective unit 24 of the second reflective unit group 20B from above are parallel to each other.

In this manner, the horizontal lines being parallel to the second direction perpendicular to the first direction and passing through the centers of the reflective units constituting the first and second reflective unit groups 20A and 20B are sequentially arranged in parallel with one another.

In this case, it is preferable that the distances between the first straight lines and the second straight lines be the same.

In the embodiment of FIGS. 3 and 4, conditions such as the size and area of each of the reflective units are applied without change, as described in the embodiment of FIG. 2.

According to the embodiment of FIGS. 3 and 4, the output light (incident light to reflective units) from the image output unit 30 may be transferred to the reflective units 23 and 24 of the second reflective unit group 20B through the space between the adjacent reflective units 21 and 22 of the first reflecting unit group 20A without overlapping the reflective units 21 and 22 of the first reflective unit group 20A.

Therefore, there is provided the advantage of providing a wide field of view not only in the vertical direction but also in the horizontal direction.

Although each of the reflective unit groups 20A and 20B is shown as including two reflective units in the embodiment of FIGS. 3 and 4, this is merely an example. Each of the reflective unit groups 20A and 20B may include a single reflective unit or three or more reflective units.

Figure 5:
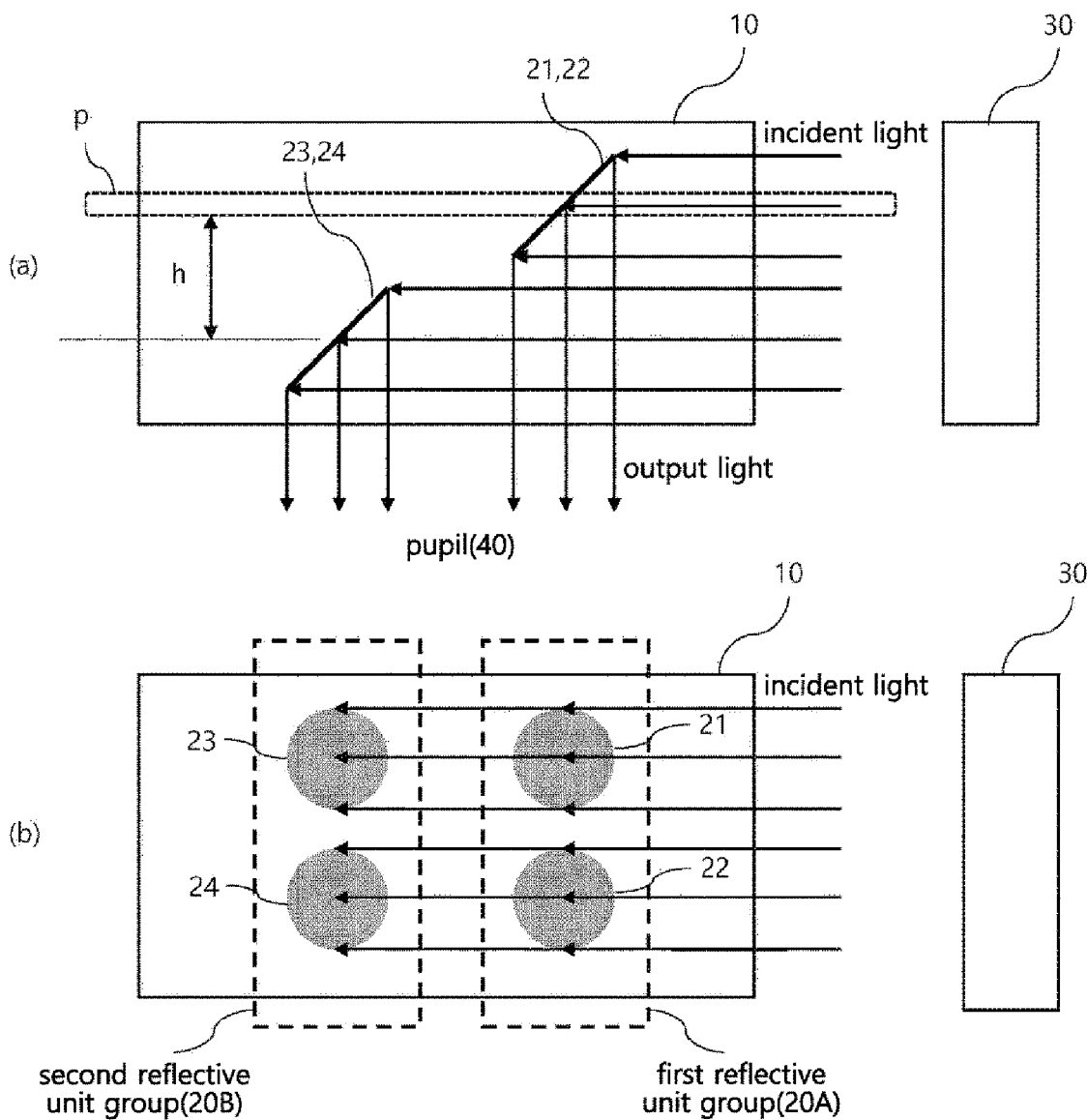
FIG. 5 shows still another embodiment of an optical device (100) for augmented reality according to the present invention.

FIG. 5 shows diagrams of still another embodiment of an optical device 100 for augmented reality according to the present invention, wherein FIG. 5(a) is a top view when viewed in a state in which the optical device 100 for augmented reality is placed in front of a user and FIG. 5(b) is a front view when the optical device 100 for augmented reality is placed in front of the user.

The embodiment of FIG. 5 is similar to the embodiment of FIGS. 3 and 4, but is characterized in that the corresponding centers of reflective units constituting reflective unit groups 20A and 20B are arranged alongside each other in a second direction perpendicular to a first direction and the reflective units of the reflective unit group 20B are disposed closer to the pupil 40. In the embodiment of FIG. 5, it should be noted that the number of reflective unit groups may be n (where n is a natural number equal to or larger than 2), however, only the two reflective groups 20A and 20B are shown for convenience of description.

In other words, the embodiment of FIG. 5 is characterized in that n reflective unit groups 20A and 20B (where n is a natural number equal to or larger than 2) each including one or more reflective units 21 and 22, or 23 and 24 arranged in a line along the first direction, which is any one straight-line direction, on the surface of the optical means 10 or in the inside of the optical means 10 are sequentially arranged in parallel with each other at intervals in the second direction perpendicular to the first direction on the surface of the optical means 10 or inside the optical means 10, and wherein the height of the reflective units constituting the k-th one of the n reflective unit groups in a direction perpendicular to the first and second directions from a plane p formed by the first and second directions of the first reflective unit group 20A is higher than the height of the reflective units constituting the (k−1)-th reflective unit group in the direction perpendicular to the first and second directions, from the plane p. In this case, k is a natural number in the range of 2≤k≤n.

In this case, the first reflective unit group 20A refers to a reflecting unit group 20A located at the shortest distance from the image output unit 30. Accordingly, k increase in a direction away from the second reflective unit group 20A which is located at the shortest distance from the image output unit 30 except for the first reflective unit group 20A.

Referring to FIG. 5, it can be seen that since the height of the first reflective unit group 20A in the direction perpendicular to the first and second directions from the plane p defined by the first and second directions is 0 and the height of the second reflective unit group 20B in the direction perpendicular to the first and second directions from the plane p is h, the second reflective group 20B is disposed to protrude such that the height of the second reflective unit group 20B is higher than that of the first reflective unit group 20A with respect to the plane p.

In other words, the embodiment of FIG. 5 is characterized in that the reflective unit groups 20A and 20B configured not to block a light path from the image output unit 30 in such a manner that the reflective unit groups 20A and 20B are sequentially arranged such that the height thereof is gradually increased, i.e., such that they become closer to the pupil 40.

According to this configuration, each of the plurality of reflective units 21, 22, 23, and 24 constituting the n reflective unit groups 20A and 20B may reflect the image light, output from the image output unit 30 configured to output image light corresponding to an image for augmented reality, toward the pupil 40 of an eye of the user.

Meanwhile, a configuration may be made not to block an optical path from the image output unit 30 in such a manner that the reflective unit groups 20A and 20B are sequentially arranged such that the height is gradually decreased, i.e., they become away from the pupil 40.

In the embodiment shown in FIG. 5, when "n" is increased, the field of view increases accordingly, but the thickness also increases correspondingly. When the thickness increases, the volume increases and the weight increases. Accordingly, it is necessary to select "n" within an appropriate range.

Although each of the reflective unit groups 20A and 20B is shown as including two reflective units in the embodiment of FIG. 5, this is merely an example. Each of the reflective unit groups 20A and 20B may include a single reflective unit or three or more reflective units.

Figure 6:
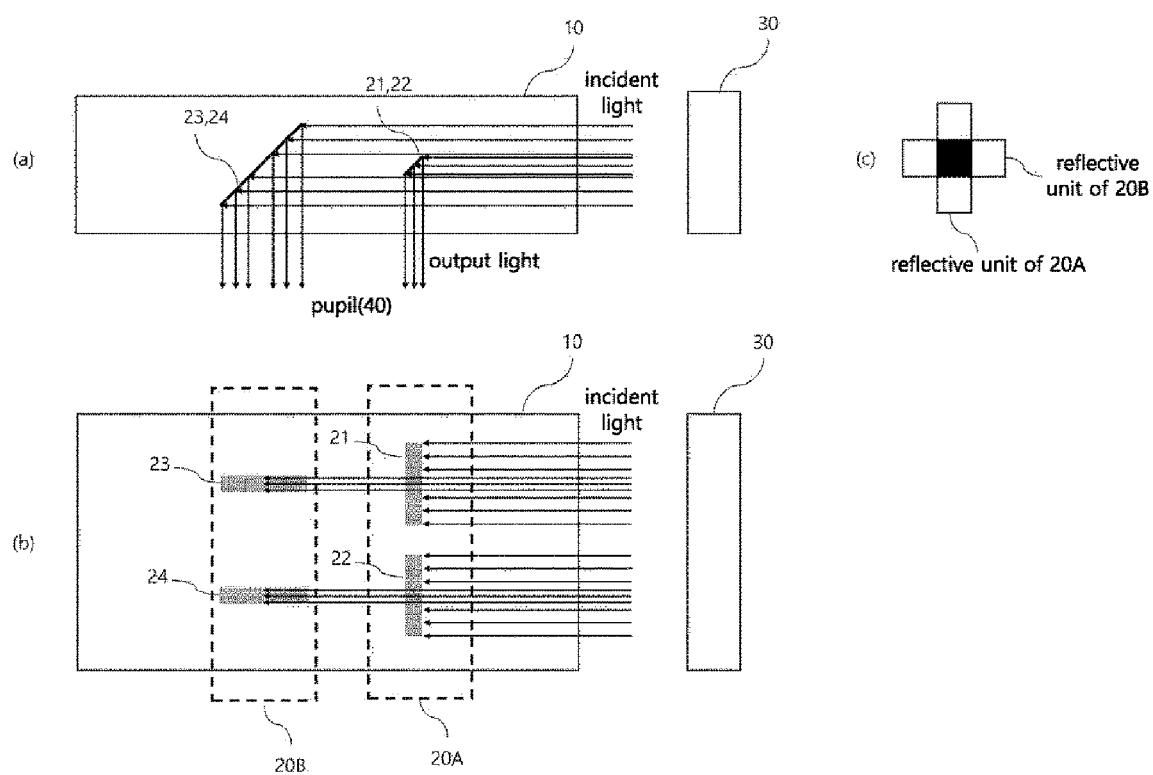
FIG. 6 shows still another embodiment of an optical device (100) for augmented reality according to the present invention.

FIG. 6 shows diagrams of still another embodiment of an optical device 100 for augmented reality according to the present invention, wherein FIG. 6(a) is a top view when viewed in a state in which the optical device 100 for augmented reality is placed in front of a user and FIG. 6(b) is a front view when the optical device 100 for augmented reality is placed in front of the user.

The embodiment of FIG. 6 is characterized in that two reflective unit groups 20A and 20B are arranged alongside each other in a second direction, as described in the embodiment of FIG. 3, in which case each pair of reflective units of the first and second reflective unit groups 20A and 20B partially overlap each other when viewed in the second direction, as shown in FIG. 6(c).

In other words, the first and second reflective unit groups 20A and 20B are arranged, in which case the reflective units 23 and 24 of the second reflective unit group 20B are arranged alongside with the first reflective units 21 and 22 of the first reflective unit group 20A so that they are located on a horizontal line parallel to the second direction, as described in FIG. 3, and each pair of reflective units 21 and 23, or 22 and 24 of the first and second reflective unit groups 20A and 20B partially overlap each other when viewed in the second direction.

According to this configuration, each of the reflective units 21, 22, 23, and 24 may reflect the image light, output from the image output unit 30 configured to output image light corresponding to an image for augmented reality, toward the pupil of an eye of the user.

In this case, the image output unit 30 is located in the second direction.

In FIG. 6(c), the black portion indicates a region where the reflective unit 21 of the first reflective unit group 20A and the reflective unit 23 of the second reflective unit group 20B overlap each other and image light is not transferred to the reflective unit 23 of the second reflective unit group 20B.

The reflective unit 23 of the second reflective unit group 20B may not reflect image light corresponding to the overlapping region to the pupil 50, but the image light corresponding to this region may be transferred to the pupil 50 by the reflective unit 21 of the first reflective unit group 20A.

Accordingly, as a whole, a cross-shaped image for augmented reality may be projected onto the pupil 50 of the user.

Although the rectangular shapes of the reflective units 21, 23, 22 and 24 arranged to be off-centered with each other in the horizontal and vertical directions are shown In FIG. 6, other shapes such as triangles may be used to be off-centered with each other.

Furthermore, in FIG. 6, the pair of reflective units located alongside each other in the second direction are shown as a pair of rectangles having the same shape through rotation, however, this is merely an example. Instead, they may be configured in completely different shapes.

For example, the reflective unit 21 of the first reflective unit group 20A has a triangular shape and the reflective units 23 and 24 of the second reflective unit group 20B may have a shape such as a square or a circle when they are viewed from the front.

In other words, it is sufficient only if the reflective units partially overlap each other, as shown in FIG. 6(*c*), when viewed in the second direction. The specific shapes of the reflective units are irrelevant to this issue. However, a case where reflective units completely overlap each other when viewed in the second direction is not suitable because image light is not transmitted to the downstream reflective unit.

Furthermore, although the reflecting units 21, 22, 23, and 24 included in the reflective unit groups 20A and 20B are all shown as having the same shape and rotational relationship in the embodiment of FIG. 6, but this is merely an example. The reflecting units included in the reflective unit groups may also have different shapes and rotational relationships.

Although each of the reflective unit groups 20A and 20B is also shown as including two reflective units in the embodiment of FIG. 6, this is merely an example. Each of the reflective unit groups 20A and 20B may include a single reflective unit or three or more reflective units.

Figure 7:
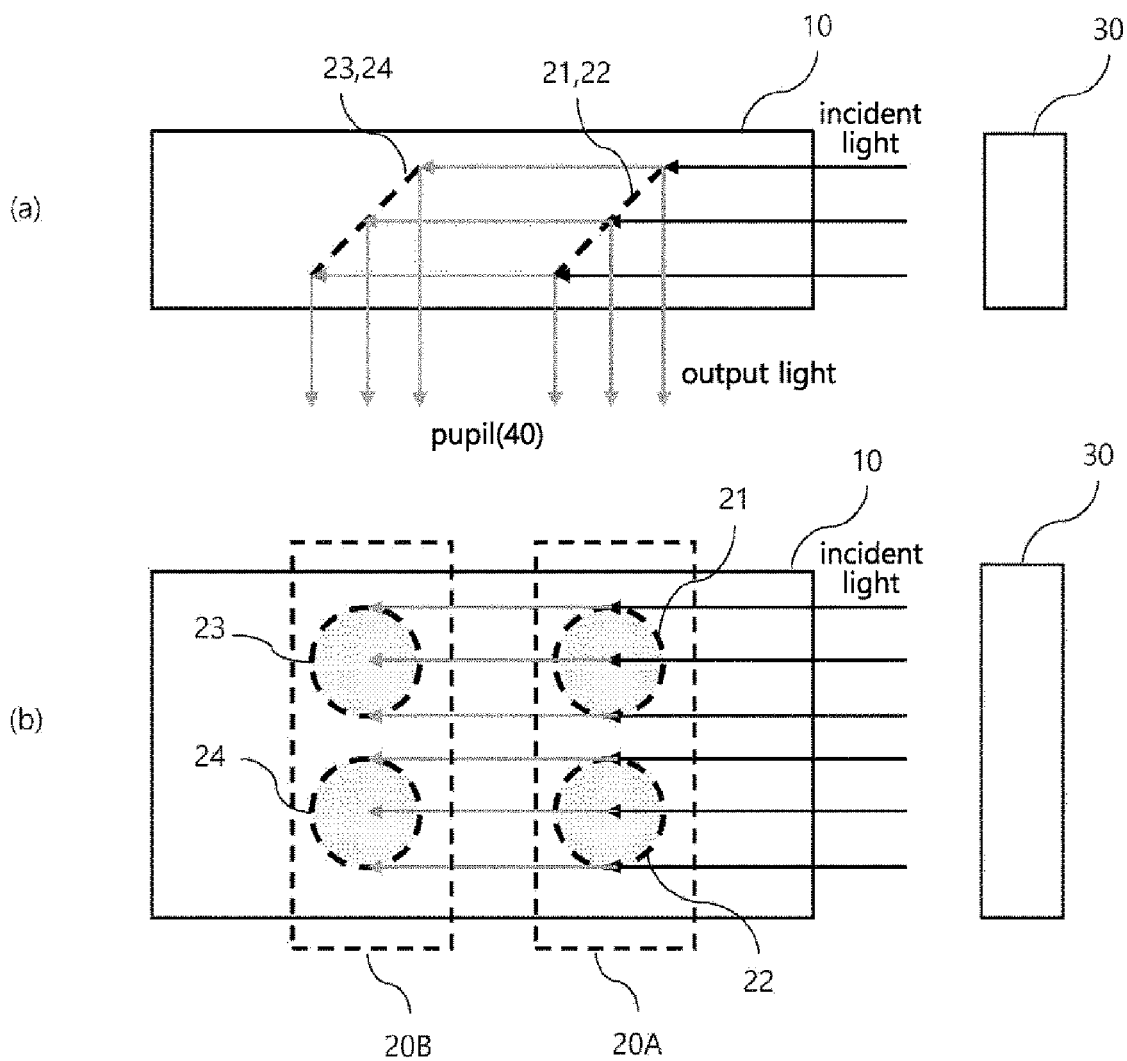
FIG. 7 shows still another embodiment of an optical device (100) for augmented reality according to the present invention.

FIG. 7 shows diagrams of still another embodiment of an optical device 100 for augmented reality according to the present invention, wherein FIG. 7(*a*) is a top view when viewed in a state in which the optical device 100 for augmented reality is placed in front of a user and FIG. 7(*b*) is a front view when the optical device 100 for augmented reality is placed in front of the user.

The embodiment of FIG. 7 is characterized in that two reflective unit groups 20A and 20B each including one or more reflective units 20 are provided, as described in conjunction with FIG. 6, and wherein the reflective units 21 and 22 of the first reflective unit group 20A are made of a translucent material which allows to transmit part of the image light, output from the image output unit 30 configured to output image light corresponding to an image for augmented reality, therethrough and to the reflective units 23 and 24 of the second reflective unit group 20B while reflecting part of the image light, output from the image output unit 30, toward the pupil 40 of an eye of the user.

Further, the reflective units 23 and 24 of the second reflective unit group 20B reflect the image light, incident through the reflective units 21 and 22 of the first reflective unit group 20A made of the translucent material, toward the pupil of the eye of the user.

In this case, it is possible that the reflective units 23 and 24 of the second reflective unit group 20B may also be made of a translucent material.

In this case, the translucent material refers to a material such as a half-lens having the property of reflecting part of incident image light but transmitting part of it therethrough.

Since such a translucent material half-lens itself is known in the prior art, a detailed description thereof will be omitted herein.

According to the embodiment of FIG. 7, since the reflective units 21 and 22 of the first reflective unit group 20A are made of a translucent material, the reflective units 21 and 22 may transmit incident light therethrough in part, and the transmitted incident light may be reflected from the reflective units 23 and 24 of the second reflective unit group 20B and transferred to the pupil 30.

Although each of the reflective unit groups 20A and 20B is also shown as including two reflective units in the embodiment of FIG. 7, this is merely an example. Each of the reflective unit groups 20A and 20B may include a single reflective unit or three or more reflective units.

Furthermore, although only two reflective unit groups are shown in the embodiment of FIG. 7, three or more reflective unit groups may be formed. In this case, the second reflective unit group 20B includes a plurality of second reflective unit groups.

Figure 8:
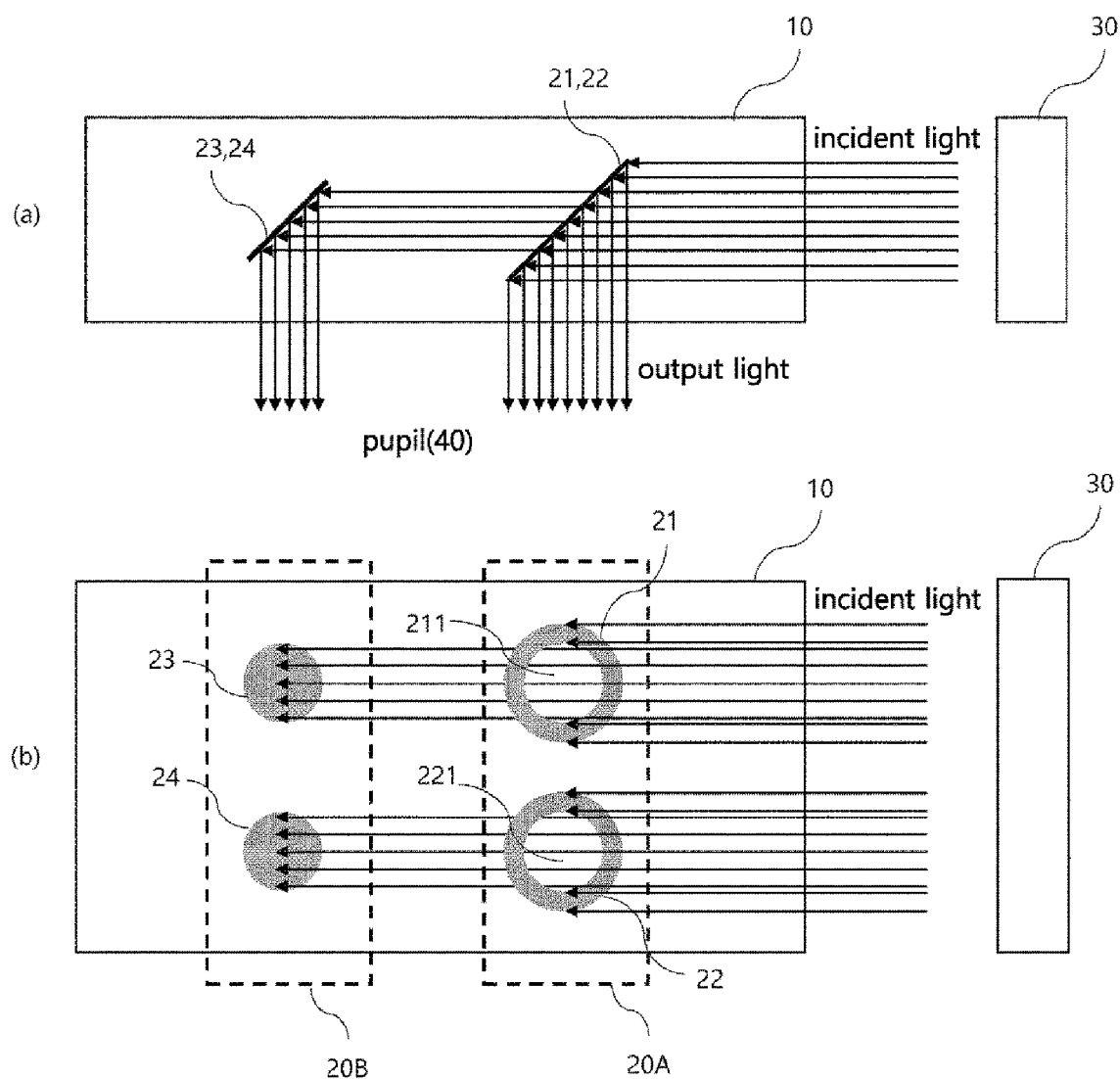
FIG. 8 shows still another embodiment of an optical device (100) for augmented reality according to the present invention.

FIG. 8 shows diagrams of still another embodiment of an optical device 100 for augmented reality according to the present invention, wherein FIG. 8(*a*) is a top view when viewed in a state in which the optical device 100 for augmented reality is placed in front of a user and FIG. 8(*b*) is a front view when the optical device 100 for augmented reality is placed in front of the user.

The embodiment of FIG. 8 is characterized in that two reflective unit groups 20A and 20B each including one or more reflective units 20 are arranged, as described in conjunction with FIG. 6, and wherein through holes 211 and 221 are formed in the reflective units 21 and 22 of the first reflective unit group 20A to transmit incident light therethrough, transmit part of the image light, output from the image output unit 30 configured to output image light corresponding to an image for augmented reality therethrough, to the reflective units 23 and 24 of the second reflective unit group 20B and wherein part of the image light output from the image output unit 30 is reflected by the portions other than the through holes 211 and 221 and transferred toward the pupil 40 of the eye of the user.

In this case, since no through holes are formed in the reflective units 23 and 24 of the second reflective unit group 20B, the image light incident through the through holes 211 and 221 of the reflective unit 21 and 22 of the first reflective unit group 20A is reflected toward the pupil of an eye of the user.

Although each of the reflective unit groups 20A and 20B is also shown as including two reflective units in the embodiment of FIG. 8, this is merely an example. Each of the reflective unit groups 20A and 20B may include a single reflective unit or three or more reflective units.

Meanwhile, in the above embodiments, each of the plurality of reflective units 21 to 24 is characterized in that it is disposed such that the distance d to adjacent reflective units 21 to 24 is smaller than the size of the human pupil 40.

In general, it is known that the sizes (diameters) of the pupils of people range from 2 to 8 mm on average. Accordingly, it is preferable that each of the plurality of reflective units 21 to 24 in the present invention be disposed such that the distance to adjacent reflective units 21 to 24 is 8 mm or less.

In this case, the distance d (or the interval d) between the reflective units 21 to 24 may be the minimum value between points on the boundary lines of two adjacent reflective units two of 21 to 24 when the plurality of reflective units 21 to 24 is viewed from a location in front of the plurality of reflective units 21 to 24.

Furthermore, the distance d (or the interval d) between the reflective units 21 to 24 may be the minimum value between points on the boundary lines of the orthogonal projections of the reflective units 21 to 24 projected onto a plane perpendicular to a forward direction from the pupil 40 when the user gazes forward.

Furthermore, the reflective units 21 to 24 may not be disposed in the center in the forward direction from the pupil of the user. In this case, the distance d (or the interval d) between the reflective units 21 to 24 may be the minimum value between points on the boundary lines of the orthogonal projections of the reflective units 21 to 24 projected onto a plane perpendicular to a direction from the pupil 40 to the reflective units 21 to 24 when the user gazes in the direction of the reflective units 21 to 24.

Meanwhile, the distances d between the plurality of reflective units 21 to 24 are preferably the same, but are not necessarily the same. The distances d may be partially different when necessary.

Meanwhile, in the above embodiments, it is preferable that the size of each of the plurality of reflective units 21 to 24 be also smaller than the size of the human pupil. In other words, it is preferable that the size of each of the plurality of reflective units 21 to 24 be 8 mm or less. In this case, the size of each of the reflective units 21 to 24 is defined to mean the maximum length between any two points on the boundary line of each of the reflective units 21 to 24.

In this case, the size of each of the reflective units 21 to 24 may be the maximum length between any two points on the boundary line of the orthogonal projection of each of the reflective units 21 to 24 projected onto a plane perpendicular to a forward direction from the pupil 40 when the user gazes forward.

Furthermore, each of the reflective units 21 to 24 may not be disposed in the center in the forward direction from the pupil of the user. In this case, the size of each of the reflective units 21 to 24 may be the maximum length between any two points on the boundary line of the orthogonal projection of each of the reflective units 21 to 24 projected onto a plane perpendicular to the direction from the pupil 40 to each of the reflective units 21 to 24 when the user gazes in the direction of each of the reflective units 21 to 24.

Meanwhile, the sizes of the plurality of reflective units 21 to 24 are preferably the same, but are not necessarily the same. The sizes may be partially different when necessary.

Furthermore, in the present invention, it is preferable that the area of each of the plurality of reflective units 21 to 24 may be formed to be smaller than the area of the human pupil 40. For example, when the pupils of people are considered to have a circular shape, the diameters of the pupils range from 2 to 8 mm and the radii thereof range from 1 to 4 mm. Accordingly, the areas of the pupils have a maximum of $16\pi$ (mm$^2$) according to the equation "$\pi r^2$," and thus the area of each of the plurality of reflective units 21 to 24 may be formed to have a value of $16\pi$ (mm$^2$) or less.

In this case, the area of each of the plurality of reflective units 21 to 24 may be the area of the orthogonal projection of each of the reflective units 21 to 24 projected onto a plane perpendicular to a forward direction from the pupil 40 when the user gazes forward.

Furthermore, each of the reflective units 21 to 24 may not be disposed in the center in the forward direction from the pupil of the user. In this case, the area of each of the reflective units 21 to 24 may be the area of the orthogonal projection of each of the reflective units 21 to 24 projected onto a plane perpendicular to a direction from the pupil 40 to each of the reflective units 21 to 24 when the user gazes in the direction of each of the reflective units 21 to 24.

Meanwhile, the areas of the plurality of reflective units 21 to 24 are preferably the same, but are not necessarily the same. The areas may be partially different when necessary.

Meanwhile, when the device for augmented reality is implemented in the form of, e.g., glasses, the plurality of reflective units 21 to 24 may be disposed on the surface of a glasses lens, or may be disposed inside a glasses lens in an embedded form. In this case, the glasses lens is the optical means 10.

A principle in which the distance between the plurality of reflective units 21 to 24 needs to be smaller than the size of the pupil will be described below with reference to FIGS. 9 to 18.

Figure 9:
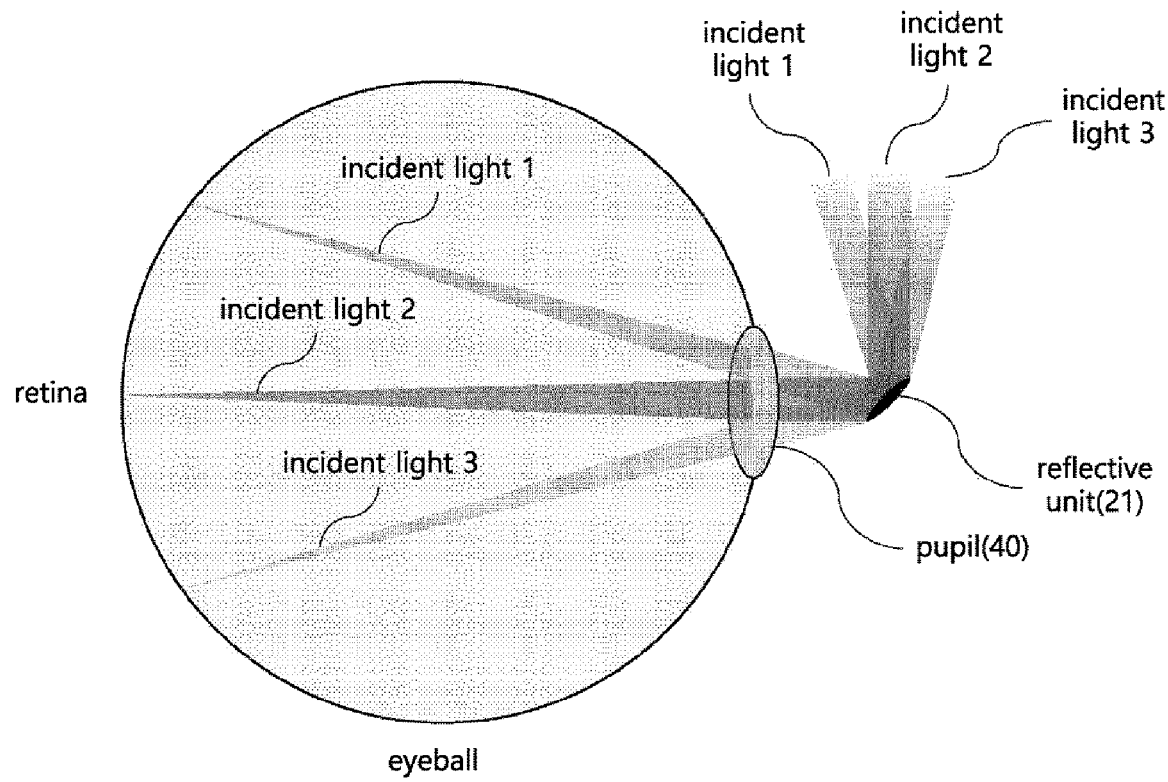
FIGS. 9 to 11 are diagrams illustrating a principle in which the distance between a plurality of reflective units (21 to 24) needs to be smaller than the size of the pupil.

As shown in FIG. 9, the image light of an image for augmented reality radiated from the image output unit 30 is reflected from the reflective units 21 to 24 and forms an image on the retina through the pupil 40, whereby a user may recognize the image for augmented reality.

In FIG. 9, incident light 1, incident light 2, and incident light 3 represent rays of incident light having different angles of incidence with respect to the eyeball, and it is assumed that all the rays of incident light are collimated parallel light rays. The collimated parallel light forms an image at a different location on the retina depending on the angle at which the light is incident on the eyeball, however, a person may not identify a difference in the location at which light is incident on the actual pupil 40. In other words, when rays of parallel light have the same location of an angle of incidence with respect to the eyeball, images are formed at the same location of the retina even when they pass through different locations of the pupil 40. When the locations of the angles of incidence with respect to the eyeball are different, images are imaged at different locations of the retina regardless of the location of the pupil 40.

Figure 10:
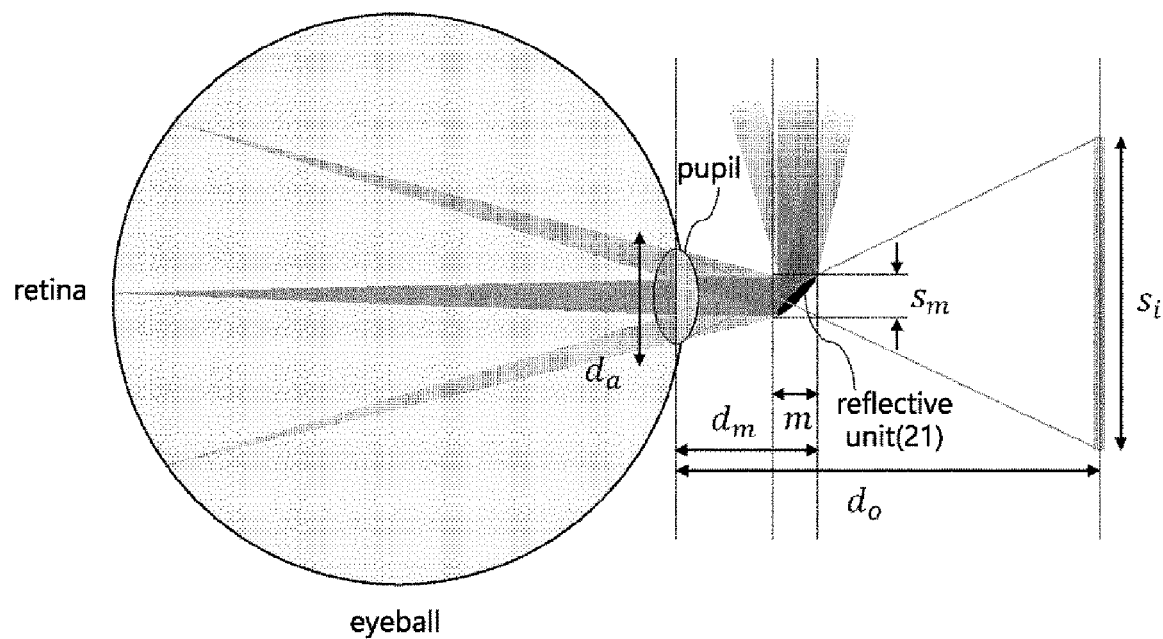

FIG. 10 is a view illustrating the size of an image for augmented reality seen through one reflective unit 21.

As described in FIG. 9, the incident light incident through the reflective unit 21 is formed on the retina according to an angle of incidence with respect to the eyeball, and the size of an image for augmented reality may be known according to the location at which the incident light incident from the reflective unit 20 through the outermost location of the pupil 40 forms an image on the retina.

In FIG. 10, when $s_i$ is the size of the image for augmented reality observed by a user through the reflective unit 21, $s_i$ may be represented by the equation below:

$$S_i = d_a \frac{d_o - d_m + m}{d_m - m} \quad (1)$$

$$m = \frac{s_m d_m}{s_m + d_a} \quad (2)$$

$d_a$: the size of the pupil 40
$d_o$: the location of the image for augmented reality
$d_m$: eye relief (the distance between the reflective unit 21 and the pupil 40)
$s_m$: the size of the reflective unit 21
m: center deviation attributable to the size of the reflective unit 21

[Equation 1] is derived by the proportional equation of a triangle formed by the reflective unit 21 and the pupil 40 and a triangle formed by the reflective unit 20 and the size $s_i$ of the image for augmented reality. In other words, it may be derived by the relationship $$\frac{s_i}{d_a} = \frac{d_o - d_m + m}{a_m - m}.$$

Furthermore, [Equation 2] is derived by the proportional equation of a triangle formed by the reflective unit 21 and the pupil 40 and a triangle formed by the reflective unit 21. In other words, $$\frac{m}{s_m} = \frac{d_m - m}{d_a}.$$

When this equation is arranged for m, [Equation 2] may be obtained.

Figure 11:
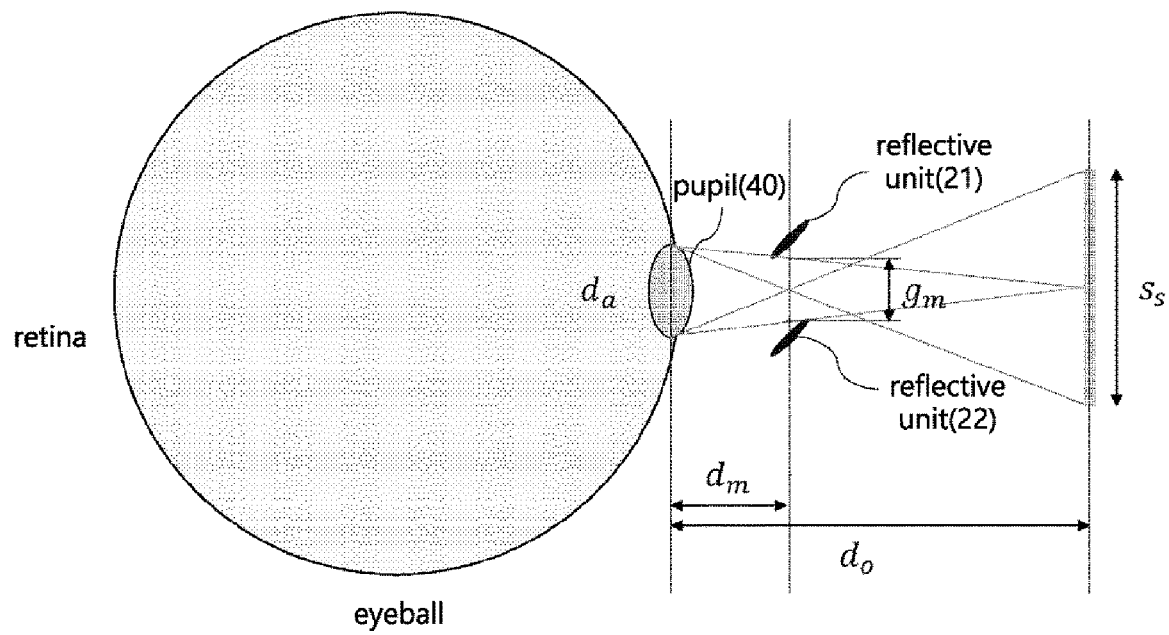

FIG. 11 is a diagram illustrating the interval between two reflective units 21 and 22 when the two reflective units 21 and 22 are disposed.

In FIG. 11, $s_s$ may be defined as the size of an image for augmented reality when the image for augmented reality is observed at the central location of the interval between two adjacent reflective units 21 and 22. In order for the image for augmented reality to be continuously observed by the two reflective units 21 and 22, $s_s$ needs to be equal to or smaller than $s_i$. This may be represented by the equation below:

$$S_s \le d_a \frac{d_o - d_m}{d_m} \le S_i = d_a \frac{d_o - d_m + m}{d_m - m} \quad (3)$$

Meanwhile, the interval $g_m$ between the reflective units 21 and 22 may be defined based on the proportional equation of a triangle, as follows:

$$g_m \le d_a \frac{d_o - d_m}{d_o} \quad (4)$$

In this case, it can be seen that the interval between the reflective units 21 and 22 is smaller than $d_a$, which is the size of the pupil 40 since $d_o$ is always larger than $d_m$.

FIGS. 12 to 15 are views illustrating a case in which the interval between reflective units 21 and 22 is smaller than the size of the pupil 40.

Figure 12:
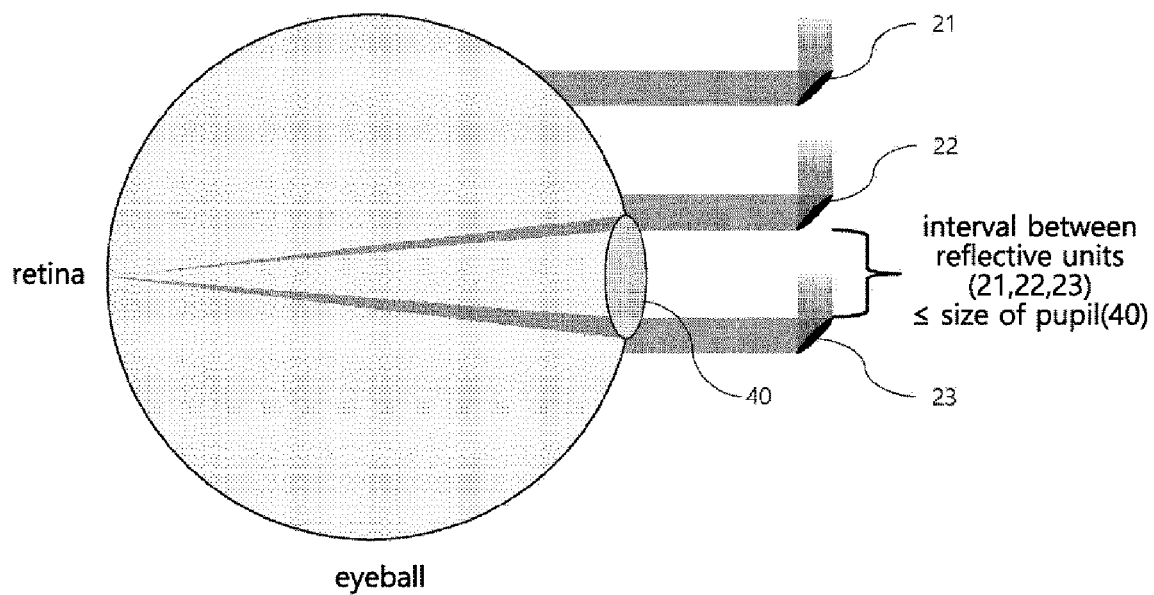
FIGS. 12 to 15 are views illustrating a case in which the interval between reflective units (21 and 22) is smaller than the size of the pupil (40)

In FIG. 12, it can be seen that the interval between the reflective units 21, 22, and 23 is disposed to be smaller than the size of the pupil 40, in which case the angles of incidence of rays of incident light with respect to the eyeball are all the same, so that images are formed at the same location on the retina.

As shown in FIG. 12, the two adjacent reflective units are disposed at the interval smaller than the size of the pupil 40. Accordingly, the upper reflective unit 22 overlaps the pupil 40 at the same time that the lower reflective unit 23 leaves the pupil 40, and rays of incident light reflected from the respective reflective units 22 and 23 form images at the same location on the retina.

Figure 13:
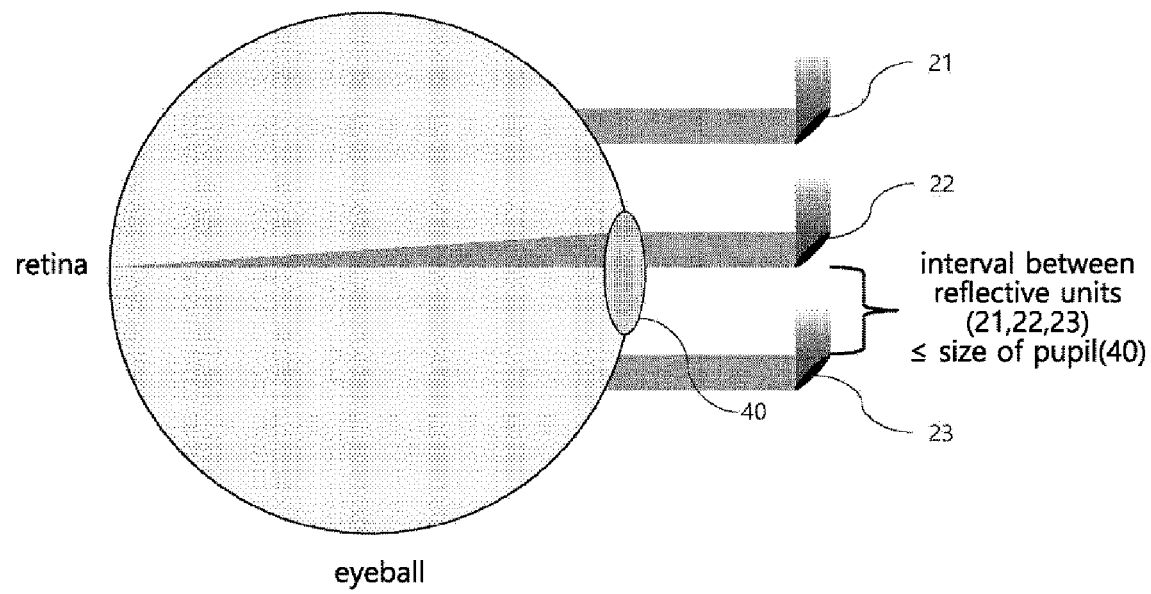
Figure 14:
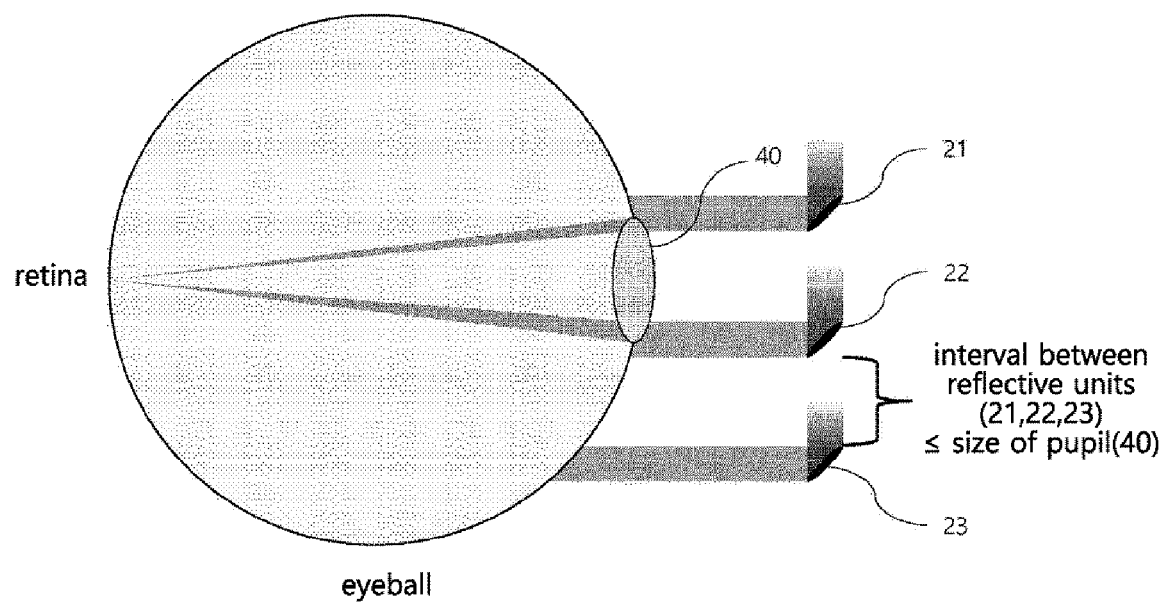

In this state, when a user further moves the pupil upward, the state shown in FIG. 13 is obtained. In this case, only the incident light from the reflection part 22 located at the center reaches the retina. When the pupil is further moved upward, the state shown in FIG. 14 is obtained, and rays of incident light form images at the same location on the retina by the uppermost reflective unit 21 and the center reflective unit 22 in the same manner as shown in FIG. 12.

Figure 15:
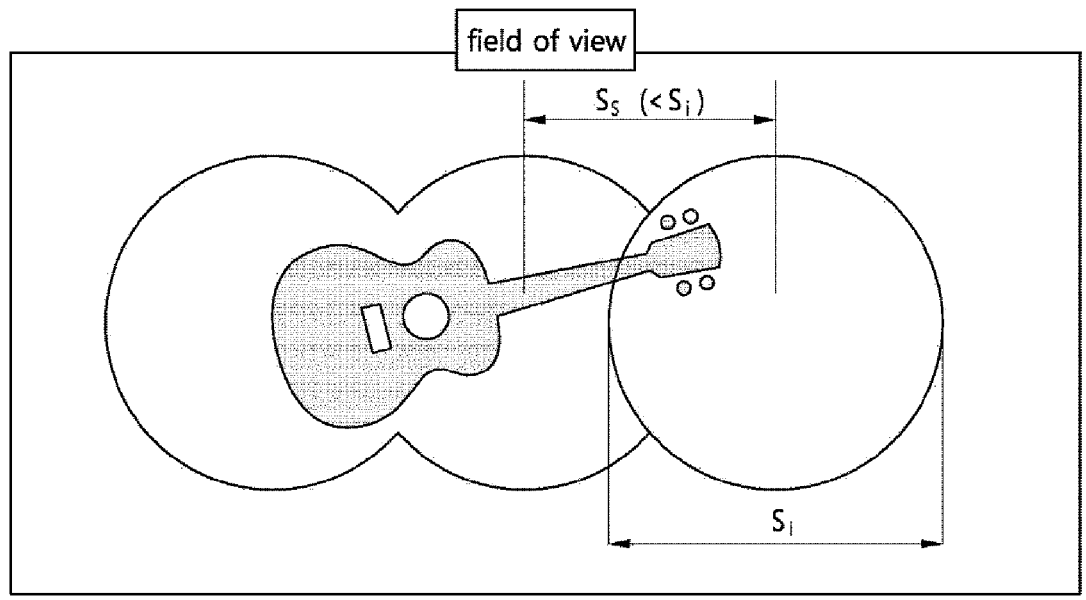

FIG. 15 shows an image for augmented reality that is observed by a user when three reflective units are disposed at intervals smaller than the size of the pupil 40.

As shown in FIG. 15, the distance $s_s$ between the centers of the respective reflective units is smaller than the size $s_i$ of an image observed by one reflective unit, and the distance between the reflective units is disposed to be smaller than the size of the pupil 40. Thus, a user may receive a guitar-shaped image for augmented reality without disconnection through the reflective units.

Figure 16:
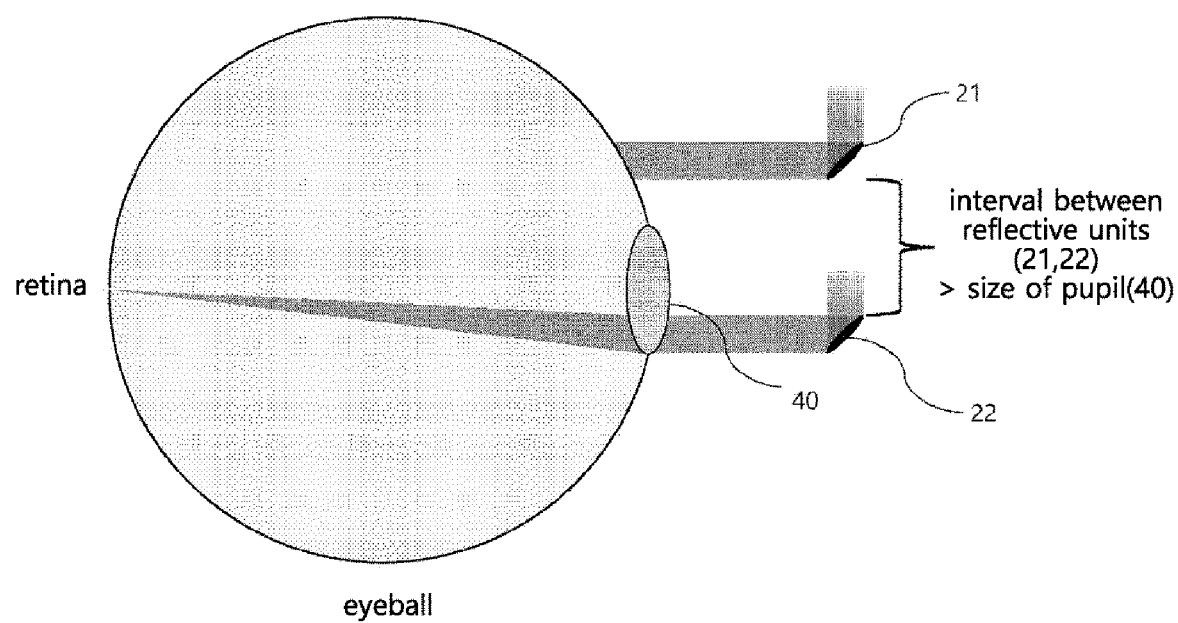
FIGS. 16 to 18 are diagrams illustrating a case in which the interval between reflective units (21 and 22) is larger than the size of the pupil (40)
Figure 17:
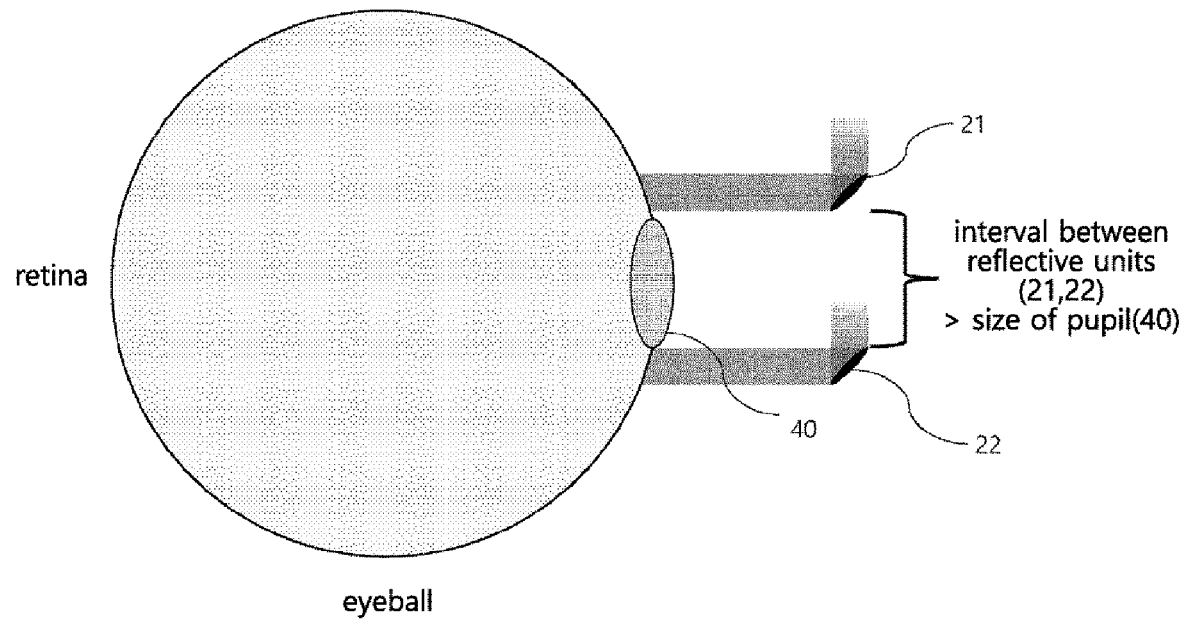
Figure 18:
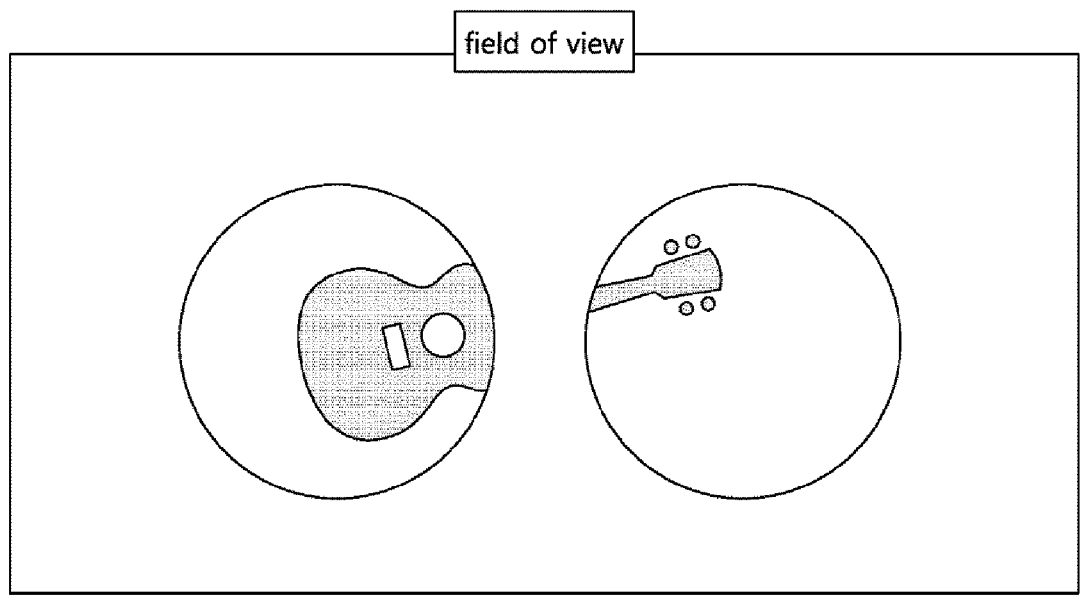

FIGS. 16 to 18 are diagrams illustrating a case in which the interval between reflective units 21 and 22 is larger than the size of the pupil 40.

In FIG. 16, the interval between the reflective units 21 and 22 has a value larger than the size of the pupil 40. As shown in FIG. 16, in a state in which an image is formed on the retina by the lower reflective unit 22, when a user moves the pupil upward, the state shown in FIG. 17 is obtained. In this case, incident light does not form an image on the retina by means of either of the upper and lower reflective units 21 and 22. Accordingly, as shown in FIG. 18, the user observes an image for augmented reality in which disconnection occurs in the middle thereof.

Meanwhile, according to another aspect of the present invention, the shape of each of a plurality of reflective units 21 to 24 may be formed in a shape such as a circle, a square, a triangle, or the like when viewed from a location in front thereof, but is not limited thereto. It may have any desired shape.

Figure 19:
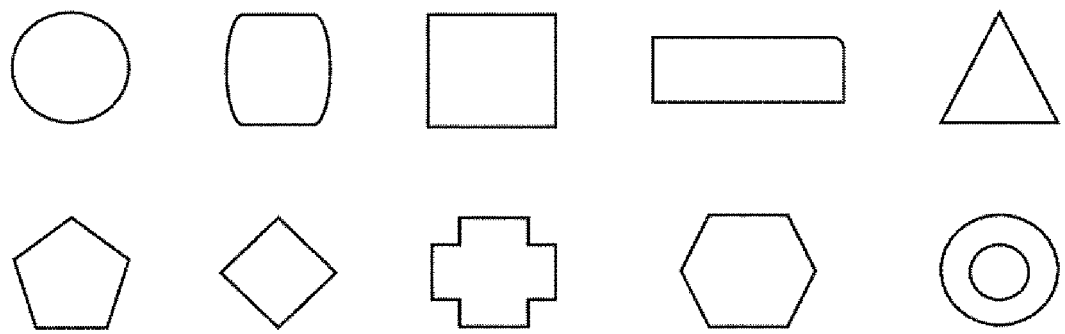
FIG. 19 illustrates various shapes when reflective units (21 to 24) are viewed from a location in front thereof.

FIG. 19 illustrates various shapes when reflective units 21 to 24 are viewed from a location in front thereof. In addition to the shapes of the reflective units 21 to 24 shown in FIG. 19, other shapes may also be applied to the present invention.

In particular, it may also be possible to form each of the plurality of reflecting units 21 to 24 in an asymmetric shape representing a shape other than a point-symmetric shape.

In this case, the point-symmetric shape is defined as a shape in which there is a specific point that allows the shape to be always the same for all rotation angles when a reflective unit is rotated around a specific point on the plane of the reflective unit. The asymmetric shape is defined as a shape that is not a point-symmetric shape, i.e., a shape in which there is no specific point that allows the shape to be always the same for all rotation angles when a reflective unit is rotated around a specific point on the plane of the reflective unit.

Examples of the point-symmetric shape include a circle and a donut shape, and examples of the asymmetric shape include a triangle, a square, an oval, a pentagon, a hexagon, and other irregular shapes.

For example, a circle is a point-symmetric shape because it always has the same shape for all rotation angles when it is rotated based on the center point of the circle. In addition, a circular shape in which a hole is formed, such as a donut shape, is also a point-symmetric shape.

Meanwhile, an equilateral triangle may not always be viewed as the same shape for all angles because the equilateral triangle becomes the same as the original shape when it is rotated by 120 degrees, 240 degrees, or 360 degrees based on the center thereof but is not the same shape as the original shape at angles other than the above angles. Accordingly, in the present invention, the equilateral triangle is classified as an asymmetric shape rather than a point-symmetric shape.

Furthermore, a square is also classified as an asymmetric shape rather than a point-symmetric shape in the present invention because it becomes the same as the original shape each time it is rotated by 90 degrees from the center point thereof but is not the same shape as the original shape at other angles.

Furthermore, all the plurality of reflective units 21 to 24 does not necessarily need to have the same shape, and at least some of the reflective units 21 to 24 may have a different shape.

FIGS. 20 to 24 are diagrams illustrating luminous uniformity according to the shape of a plurality of reflective units 21 to 24 according to the present invention.

In each of FIGS. 20 to 24, the lower view is a front view when a user views the arrangement of a plurality of reflective units 21 to 24 in front thereof, and the upper view shows the luminance in each of the reflective units 21 to 24 in the arrangement of the reflective units 21 to 24 shown in the lower view. The luminance in the upper view indicates that the darker the color, the higher the luminance, and the lighter the color, the lower the luminance.

Figure 20:
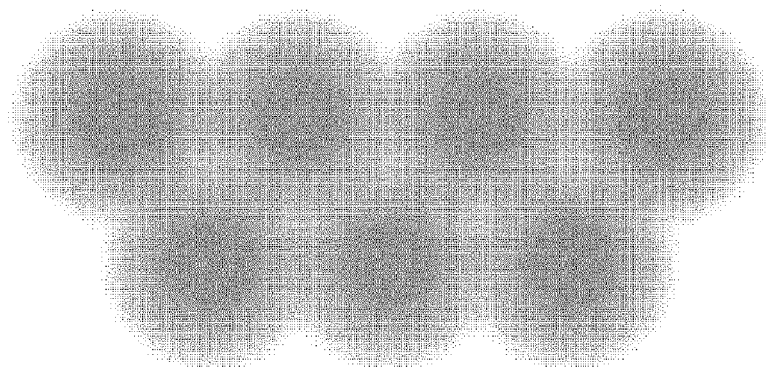
FIGS. 20 to 24 are diagrams illustrating luminous uniformity according to the shape of a plurality of reflective units (21 to 24) according to the present invention.
Figure 20:
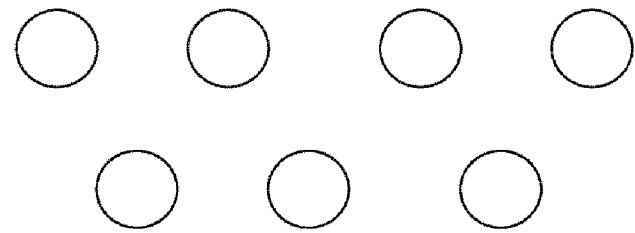

Referring to FIG. 20, it can be seen that each of the reflective units 21 to 24 has a circular shape and the luminance is low in the spaces between the reflective units 21 to 24. This means that when each of the reflective units 21 to 24 is circular, the luminance at the center of each of the reflective units 21 to 24 is high, but the luminance in the periphery of each of the reflective units 21 to 24 and the space between the reflective units 21 to 24 is lowered. This in turn means that the difference in luminance between the center of each of the reflective units 21 to 24 and other areas thereof is large, and also means that the overall luminous uniformity is not high.

Figure 21:
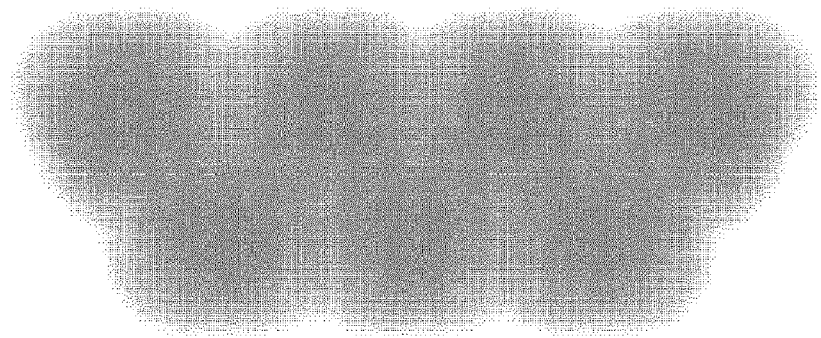
Figure 21:
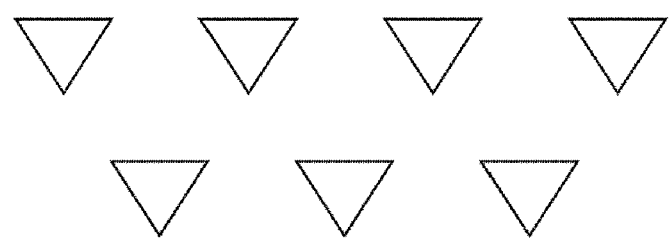

In FIG. 21, it can be seen that reflective units 20 are each arranged in an inverted triangle form, the luminance in the spaces between the reflective units 21 to 24 is higher than that of FIG. 20, and the overall luminous uniformity is improved.

Each of the reflective units 21 to 24 of FIG. 21 has an inverted triangle shape, which corresponds to the asymmetric shape defined above. It can be seen that the overall luminous uniformity of this asymmetric shape is improved compared to the circular point-symmetric shape of FIG. 20.

Figure 22:
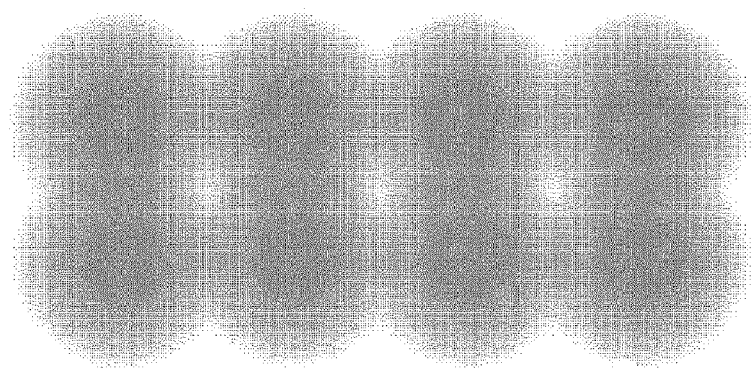
Figure 22:
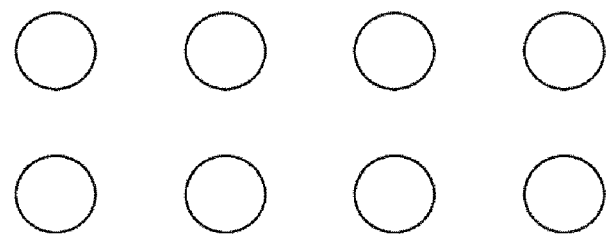

FIG. 22 shows a case where circular reflective units 21 to 24 are disposed side by side in a 4×2 arrangement. As similar to FIG. 20, the luminance of the space between the reflecting units 21 to 24 is low and thus the luminous uniformity is uneven.

Figure 23:
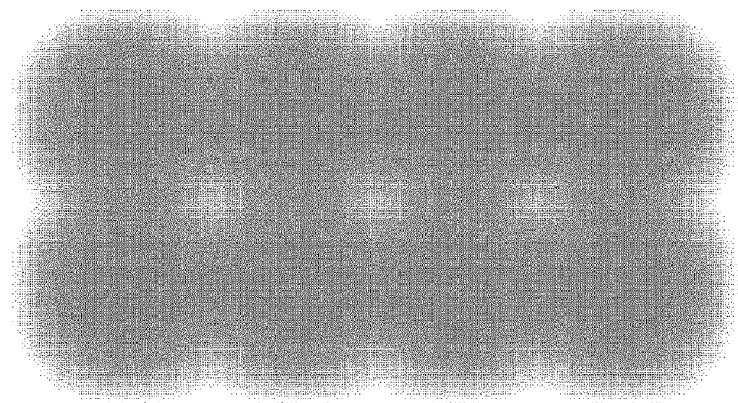
Figure 23:
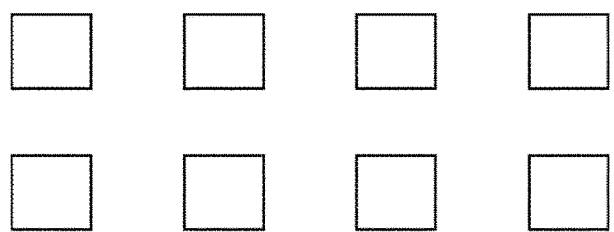

FIG. 23 shows a case in which rectangular reflective units 21 to 24 are disposed in a 4×2 arrangement. It can be seen that the luminance is evenly distributed compared to that of FIG. 22.

Each of the reflective units 21 to 24 of FIG. 23 has a rectangular shape, which corresponds to the asymmetric shape defined above. It can be seen that the overall luminous uniformity of the asymmetric shape is improved compared to that of the circular point-symmetric shape of FIG. 22.

As described above, in the arrangement of a plurality of the reflective units 21 to 24, when the reflective units 21 to 24 are formed in an asymmetric shape rather than a point-symmetric shape, the overall luminous uniformity is improved compared to that of the point-symmetric shape.

Figure 24:
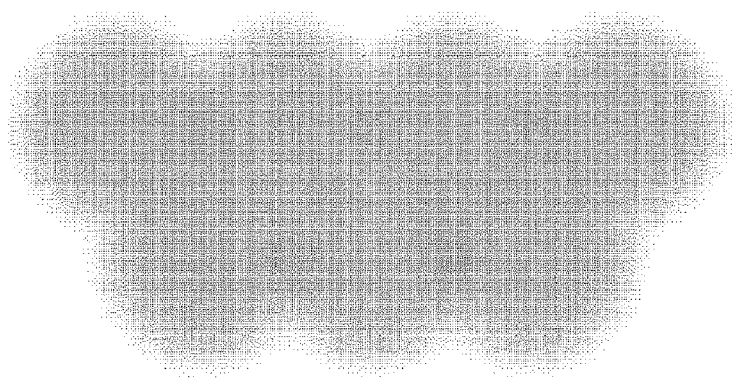
Figure 24:
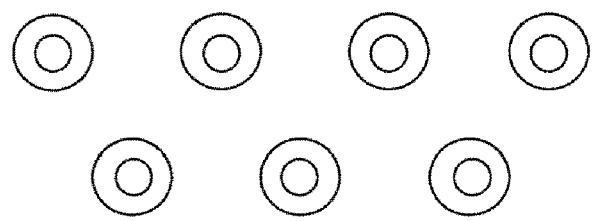

FIG. 24 shows a case in which the centers of circular reflective units 21 to 24 each in a donut shape having a through hole formed in the center thereof are each disposed to have a triangular shape similar to that shown in FIG. 2. It can be seen that the luminance is evenly distributed. However, in the case of FIG. 24, the luminance in the centers is not higher than those of other cases.

In the reflective units 21 to 24 of the embodiment of FIG. 24, image light incident onto the through holes formed in the centers thereof is not reflected, and thus the luminance in the centers may be adjusted to a low value.

In other words, according to the embodiment of FIG. 24, it can be seen that in the case of a point-symmetric shape, the luminous uniformity can be evenly distributed by forming a through hole in the center thereof.

Referring to FIGS. 20 to 24, it can be seen that the luminance distribution varies depending on each shape or arrangement.

In the case where the overall luminous uniformity is prioritized, it would be preferable to adopt the arrangement shown in FIG. 24. In the case where it is desired to increase the luminance in the centers of reflective units 21 to 24 notwithstanding the luminous uniformity is uneven, it is preferable to select an appropriate one from the arrangements of FIGS. 20 to 22.

While the embodiments according to the present invention have been described above, the present invention is not limited to the above embodiments, and other various modifications and alterations may also be possible within the scope of the present invention based on the claims and the drawings.

For example, although the above embodiments may be used independently, they may be used in combination with each other.

For example, it is obvious that the embodiments of FIGS. 1 to 8 may be used in combination with each other.

Meanwhile, in the above embodiments, the image light output from the image output unit 30 and the image light output from the reflection units 21 to 24 to the pupil 40 are shown in the form of parallel light such as linear horizontal light. However, this is shown as an example for the sake of convenience. The real image light may be evenly emitted in all directions, just like ordinary light is radiated.

Furthermore, in the embodiments of FIGS. 2 to 8, the foregoing description has been given using any one direction (the first direction) as a vertical direction, but this is illustrative on the assumption that the image output unit 30 is located on a side. The present invention may be applied without change even when the image output unit 30 is disposed in a different position by appropriately rotating the optical means 10 while taking into consideration the position of the image output unit 30.

The invention claimed is:

1. An optical device for augmented reality, the optical device comprising:
    an optical means for transmitting at least part of visible light therethrough; and
    a reflective unit group including a plurality of reflective units disposed in a line along a first direction, which is any straight-line direction, on a surface of the optical means or inside the optical means;
    wherein the plurality of reflective units reflect image light, output from an image output unit configured to output image light corresponding to an image for augmented reality, toward a pupil of an eye of a user; and wherein each of the plurality of reflective units is disposed such that a distance to an adjacent reflective unit is 8 mm or less.

2. The optical device of claim 1, wherein the distance between the adjacent reflective units is a minimum value between points on boundary lines of orthogonal projections of the adjacent reflective units projected onto a plane perpendicular to a forward direction from the pupil when the user gazes forward.

3. The optical device of claim 1, wherein a size of each of the plurality of reflective units is 8 mm or less.

4. The optical device of claim 3, wherein the size of each of the plurality of reflective units is a maximum length between any two points on a boundary line of the reflective unit.

5. An optical device for augmented reality, the optical device comprising:
an optical means for transmitting at least part of visible light therethrough;
a first reflective unit group including one or more reflective units arranged in a line along a first direction, which is any straight-line direction, on a surface of the optical means or inside the optical means; and
a second reflective unit group including one or more reflective units arranged in a line along the first direction on the surface of the optical means or inside the optical means and arranged in parallel with the reflective units of the first reflective unit group at intervals in a second direction perpendicular to the first direction;
wherein the reflective units reflect image light, output from an image output unit configured to output image light corresponding to an image for augmented reality, toward a pupil of an eye of a user; and
wherein horizontal lines passing through centers of each of the reflective units of the second reflective unit group and parallel to the second direction and horizontal lines passing through centers of each of the reflective units of the first reflective unit group and parallel to the second direction are sequentially arranged in parallel with one another.

6. The optical device of claim 5, wherein each of the plurality of reflective units is disposed such that a distance to an adjacent reflective unit is 8 mm or less.

7. The optical device of claim 5, wherein a size of each of the plurality of reflective units is 8 mm or less.

8. The optical device of claim 5, wherein:
a shape of each of the plurality of reflective units is formed in an asymmetric shape representing a shape other than a point-symmetric shape; and
the point-symmetric shape is a shape in which there is a specific point that allows the shape to be always same for all rotation angles when a corresponding reflective unit is rotated around a specific point on a plane of the reflective unit, and the asymmetric shape is a shape that is not a point-symmetric shape, which is a shape in which there is no specific point that allows the shape to be always same for all rotation angles when a corresponding reflective unit is rotated around a specific point on a plane of the reflective unit.

9. An optical device for augmented reality, the optical device comprising:
an optical means for transmitting at least part of visible light therethrough; and
n reflective unit groups (where n is a natural number equal to or larger than 2) each including one or more reflective units arranged in a line along a first direction, which is any straight-line direction, on a surface of the optical means or inside the optical means;
wherein the n reflective unit groups are sequentially arranged in parallel with each other at intervals in a second direction perpendicular to the first direction on the surface of the optical means or inside the optical means;
wherein each of the reflective units constituting the n reflective unit groups reflects image light, output from an image output unit configured to output image light corresponding to an image for augmented reality, toward a pupil of an eye of a user; and
wherein a k-th reflective unit group among the n reflective unit groups is arranged in a protruded manner such that a height of reflective units constituting the k-th reflective unit group in a direction, perpendicular to the first and second directions, from a plane p formed by the first and second directions of the first reflective unit group is higher than a height of reflective units constituting a (k−1)-th reflective unit group in the direction, perpendicular to the first and second directions, from the plane p (where k is a natural number in a range of 2≤k≤n).

10. The optical device of claim 9, wherein each of the plurality of reflective units is disposed such that a distance to an adjacent reflective unit is 8 mm or less.

11. The optical device of claim 9, wherein a size of each of the plurality of reflective units is 8 mm or less.

12. The optical device of claim 9, wherein:
a shape of each of the plurality of reflective units is formed in an asymmetric shape representing a shape other than a point-symmetric shape; and
the point-symmetric shape is a shape in which there is a specific point that allows the shape to be always same for all rotation angles when a corresponding reflective unit is rotated around a specific point on a plane of the reflective unit, and the asymmetric shape is a shape that is not a point-symmetric shape, which is a shape in which there is no specific point that allows the shape to be always same for all rotation angles when a corresponding reflective unit is rotated around a specific point on a plane of the reflective unit.

13. An optical device for augmented reality, the optical device comprising:
an optical means for transmitting at least part of visible light therethrough;
a first reflective unit group including one or more reflective units arranged in a line along a first direction, which is any straight-line direction, on a surface of the optical means or inside the optical means; and
a second reflective unit group including one or more reflective units arranged in a line along the first direction on the surface of the optical means or inside the optical means and arranged in parallel with the reflective units of the first reflective unit group at intervals in a second direction perpendicular to the first direction;
wherein the reflective units reflect image light, output from an image output unit configured to output image light corresponding to an image for augmented reality, toward a pupil of an eye of a user; and
wherein each pair of reflective units of the first and second reflective unit groups located alongside each other in the second direction partially overlap each other when viewed in the second direction.

14. The optical device of claim 13, wherein each of the plurality of reflective units is disposed such that a distance to an adjacent reflective unit is 8 mm or less.

15. The optical device of claim 13, wherein a size of each of the plurality of reflective units is 8 mm or less.

16. The optical device of claim 13, wherein:
a shape of each of the plurality of reflective units is formed in an asymmetric shape representing a shape other than a point-symmetric shape; and
the point-symmetric shape is a shape in which there is a specific point that allows the shape to be always same for all rotation angles when a corresponding reflective unit is rotated around a specific point on a plane of the reflective unit, and the asymmetric shape is a shape that is not a point-symmetric shape, which is a shape in which there is no specific point that allows the shape to be always same for all rotation angles when a corresponding reflective unit is rotated around a specific point on a plane of the reflective unit.

17. An optical device for augmented reality, the optical device comprising:
an optical means for transmitting at least part of visible light therethrough;
a first reflective unit group including one or more reflective units arranged in a line along a first direction, which is any straight-line direction, on a surface of the optical means or inside the optical means; and
a second reflective unit group including one or more reflective units arranged in a line along the first direction on the surface of the optical means or inside the optical means and arranged in parallel with the reflective units of the first reflective unit group at intervals in a second direction perpendicular to the first direction;
wherein the reflective units of the first reflective unit group are made of a translucent material and transmit part of image light, output from the image output unit configured to output image light corresponding to an image for augmented reality, therethrough to the reflective units of the second reflective unit group while reflecting part of the image light, output from the image output unit, toward a pupil of an eye of a user; and
wherein the reflective units of the second reflective unit group reflect the image light, incident through the reflective units of the first reflective unit group made of the translucent material, toward the pupil of the eye of the user.

18. The optical device of claim 17, wherein each of the plurality of reflective units is disposed such that a distance to an adjacent reflective unit is 8 mm or less.

19. The optical device of claim 17, wherein a size of each of the plurality of reflective units is 8 mm or less.

20. The optical device of claim 17, wherein:
a shape of each of the plurality of reflective units is formed in an asymmetric shape representing a shape other than a point-symmetric shape; and
the point-symmetric shape is a shape in which there is a specific point that allows the shape to be always same for all rotation angles when a corresponding reflective unit is rotated around a specific point on a plane of the reflective unit, and the asymmetric shape is a shape that is not a point-symmetric shape, which is a shape in which there is no specific point that allows the shape to be always same for all rotation angles when a corresponding reflective unit is rotated around a specific point on a plane of the reflective unit.

21. An optical device for augmented reality, the optical device comprising:
an optical means for transmitting at least part of visible light therethrough;
a first reflective unit group including one or more reflective units arranged in a line along a first direction, which is any straight-line direction, on a surface of the optical means or inside the optical means; and
a second reflective unit group including one or more reflective units arranged in a line along the first direction on the surface of the optical means or inside the optical means and arranged in parallel with the reflective units of the first reflective unit group at intervals in a second direction perpendicular to the first direction;
wherein through holes are formed in the reflective units of the first reflective unit group for transmitting incident light therethrough, and transmit part of image light, output from the image output unit configured to output image light corresponding to an image for augmented reality, therethrough to the reflective units of the second reflective unit group, and reflect part of the image light, output from the image output unit, toward a pupil of an eye of a user through portions of the reflective units other than the through holes; and
wherein the reflective units of the second reflective unit group reflect the image light, incident through the through holes of the reflective units of the first reflective unit group, toward the pupil of the eye of the user.

22. The optical device of claim 21, wherein each of the plurality of reflective units is disposed such that a distance to an adjacent reflective unit is 8 mm or less.

23. The optical device of claim 21, wherein a size of each of the plurality of reflective units is 8 mm or less.

24. The optical device of claim 21, wherein:
a shape of each of the plurality of reflective units is formed in an asymmetric shape representing a shape other than a point-symmetric shape; and
the point-symmetric shape is a shape in which there is a specific point that allows the shape to be always same for all rotation angles when a corresponding reflective unit is rotated around a specific point on a plane of the reflective unit, and the asymmetric shape is a shape that is not a point-symmetric shape, which is a shape in which there is no specific point that allows the shape to be always same for all rotation angles when a corresponding reflective unit is rotated around a specific point on a plane of the reflective unit.

25. An optical device for augmented reality, the optical device comprising:
an optical means for transmitting at least part of visible light therethrough; and
a reflective unit group including a plurality of reflective units disposed in a line along a first direction, which is any straight-line direction, on a surface of the optical means or inside the optical means;
wherein the reflective units reflect image light, output from an image output unit configured to output image light corresponding to an image for augmented reality, toward a pupil of an eye of a user,
wherein a size of each of the plurality of reflective units is 8 mm or less, and
wherein the size of each of the plurality of reflective units is a maximum length between any two points on a boundary line of an orthogonal projection of the reflective unit projected onto a plane perpendicular to a forward direction from the pupil when the user gazes forward.

26. An optical device for augmented reality, the optical device comprising:
an optical means for transmitting at least part of visible light therethrough; and a reflective unit group including a plurality of reflective units disposed in a line along a first direction, which is any straight-line direction, on a surface of the optical means or inside the optical means;

wherein the plurality of reflective units reflect image light, output from an image output unit configured to output image light corresponding to an image for augmented reality, toward a pupil of an eye of a user; and wherein an area of each of the plurality of reflective units is formed to have a value of $16\pi$ (mm$^2$) or less.

27. The optical device of claim 26, wherein the area of each of the plurality of reflective units is an area of an orthogonal projection of the reflective unit projected onto a plane perpendicular to a forward direction from the pupil when the user gazes forward.

28. An optical device for augmented reality, the optical device comprising:

an optical means for transmitting at least part of visible light therethrough; and a reflective unit group including a plurality of reflective units disposed in a line along a first direction, which is any straight-line direction, on a surface of the optical means or inside the optical means;

wherein the plurality of reflective units reflect image light, output from an image output unit configured to output image light corresponding to an image for augmented reality, toward a pupil of an eye of a user; and a shape of each of the plurality of reflective units is formed in an asymmetric shape representing a shape other than a point-symmetric shape; and the point-symmetric shape is a shape in which there is a specific point that allows the shape to be always same for all rotation angles when a corresponding reflective unit is rotated around a specific point on a plane of the reflective unit, and the asymmetric shape is a shape that is not a point-symmetric shape, which is a shape in which there is no specific point that allows the shape to be always same for all rotation angles when a corresponding reflective unit is rotated around a specific point on a plane of the reflective unit.

\* \* \* \* \*